(12) United States Patent
Nakano et al.

(10) Patent No.: US 6,755,541 B2
(45) Date of Patent: Jun. 29, 2004

(54) PROJECTOR

(75) Inventors: Hirohisa Nakano, Suwa (JP); Teruo Sakurai, Suwa (JP); Kiyotaka Nakano, Suwa (JP); Tsuyoshi Arai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 25 days.

(21) Appl. No.: 10/151,178

(22) Filed: May 21, 2002

(65) Prior Publication Data

US 2003/0081185 A1 May 1, 2003

(30) Foreign Application Priority Data

May 22, 2001 (JP) ........................................ 2001-152426
May 22, 2001 (JP) ........................................ 2001-152427

(51) Int. Cl.$^7$ ........................... G03B 21/22; G03B 21/20
(52) U.S. Cl. ........................................ 353/119; 353/87
(58) Field of Search ............................ 353/30, 31, 32, 353/33, 34, 49, 52, 60, 61, 72, 73, 82, 85, 86, 87, 97, 119, 122; 349/5, 6, 7, 8

(56) References Cited

U.S. PATENT DOCUMENTS

| 5,842,761 A | * | 12/1998 | Futakami et al. | ........... 353/119 |
| 5,860,720 A | * | 1/1999 | Negishi et al. | ............... 353/74 |
| 6,082,864 A | * | 7/2000 | Rodriguez et al. | ............ 353/87 |
| 6,345,896 B1 | * | 2/2002 | Kurosawa | ................... 353/119 |
| 6,437,909 B1 | * | 8/2002 | Okamori et al. | ............ 359/361 |

FOREIGN PATENT DOCUMENTS

JP           A 11-202407           7/1999

* cited by examiner

*Primary Examiner*—Russell Adams
*Assistant Examiner*—Andrew Sever
(74) *Attorney, Agent, or Firm*—Oliff & Berridge, PLC

(57) ABSTRACT

A structure for attaching a lamp cover (61) to an upper case (21), when a part (631C) of a fitting (631) is pressed downward by a pin member (P) to release engagement of the lamp cover (61) with the upper case (21). The lamp cover (61) is biased toward outside of the exterior case, so that the lamp cover (61) can be opened with one pressing action of with the pin member (P) and operation thereof can be facilitated.

20 Claims, 22 Drawing Sheets

PROJECTOR

BACKGROUND OF THE INVENTION

1. Field of the Invention

The present invention relates to a projector having a light source and an exterior case for accommodating the light source, which modulates a light beam irradiated by the light source and subsequently enlarges and projects the light beam to form a projection image.

2. Description of Related Art

Conventionally, a projector has been used for presentation in a conference, academic seminar, exhibition etc. The projector modulates a light beam irradiated by a light source in accordance with image information to form an optical image, and projects the optical image on a screen etc. in an enlarged manner.

Recently, projectors have come to be used in wider area such as presentation in office meeting and business trip. Further, projectors are now used in technical review session in research and development section by fetching and projecting CAD/CAM/CAE data, various seminars and workshops, and school classroom during audio-visual education. Further, projectors are used for reviewing remedy and medical guidance by projecting medical image and data such as CT scan and MRI and for effectively staging exhibitions and events attracting a lot of people.

Some of such projectors are known to have a light source and an exterior case for accommodating the light source, which modulates a light beam irradiated by the light source and subsequently enlarges and projects the light beam to form a projection image.

An opening is formed on the projector corresponding to the position of the light source for taking out and exchanging the light source when the life of the light source is expired. Ordinarily, such opening is closed with a lamp cover attachably/detachably provided to the exterior case, which can be detached from the exterior case in exchanging the light source.

The lamp cover is usually attached to the exterior case with a screw. Though such screw-fitting type is extremely simple in its attachment structure, a troublesome work of unscrewing a plurality of screws is required for detaching the lamp cover from the exterior case.

On the other hand, in some arrangements, the lamp cover is provided on the top surface of the exterior case and is attachable/detachable to the exterior case by being slid along the top surface. In such slide type, a slide guide is formed on the exterior case for slidably supporting the lamp cover, so that it is not necessary to turn a multiple of screws. However, in order to slidably open and close the lamp cover, an anti slip or a notch (similar to anti slip or notch formed on cell cover of a table clock or a remote controller) has to be formed on the surface of the lamp cover, which worsens appearance thereof.

An object of the present invention is to provide a projector capable of improving workability for exchanging a light source and appearance thereof.

On the other hand, the above-described lamp cover is usually attached to the bottom surface of the exterior case.

However, when the lamp cover is disposed on the bottom surface of the exterior case, the projector has to be turned upside down in exchanging the light source. Accordingly, after completion of exchanging work, the attitude of the projector relative to a screen has to be re-adjusted and exchanging work becomes so troublesome.

Especially, when the projector is used in audio-visual room etc., the projector is often installed on ceiling in a manner that the ceiling surface and the bottom side of the exterior case are opposed. Accordingly, the projector has to be once detached from the ceiling in order to exchange the light source, thereby making exchange work so troublesome.

On the other hand, some of the lamp cover is disposed from top surface to a side of a projector.

According to such arrangement, though the light source can be easily exchanged, the attachment structure of the lamp cover can interfere with the other arrangement. Specifically, for instance, in slide type, the surface of the exterior case has to be cut to form a guide for a lamp cover to be slid. When such guide is formed continuously along the surface of the exterior case, the guide can interfere with the other components disposed on the side of the exterior case (such as an exhaust hole for discharging exhaust air from a cooling fan toward the outside and a handle used for carrying the projector), thereby lowering freedom of design.

Another object of the present invention is to provide a projector capable of facilitating exchange work of a light source and improving freedom of design.

SUMMARY OF THE INVENTION

A projector according to an aspect of the present invention has a light source and an exterior case that accommodates the light source, the projector modulating, enlarging and projecting a light beam irradiated by the light source to form a projection image, the projector including: an opening formed on the exterior case at a position corresponding to the light source; a slidable lamp cover that closes the opening, the lamp cover being capable of being attached to and detached from the exterior case; a first biasing mechanism that biases the lamp cover along slide direction thereof toward outside of the exterior case; an engagement structure that fixes the lamp cover to the exterior case; and an operating portion that is operated to release engagement of the engagement structure by being operated.

According to the above aspect of the present invention, when the operating portion is operated to release the engagement of the lamp cover with the exterior case, the lamp cover is slid along the slide direction toward outside of the exterior case by the first biasing mechanism, thereby unfixing the lamp cover from the exterior case.

Therefore, unlike conventional screw-fitting, the lamp cover can be unfixed from the exterior case with one action of operating the operating portion for detaching the lamp cover from the exterior case, workability can be improved in exchanging the light source. The operating portion is not restricted to the operation switch etc. but may be arranged in different manner as long as the engagement of the lamp cover with the exterior case can be released.

Since the lamp cover is slid toward outside of the exterior case by the first biasing mechanism when the engagement is released, anti-slip, notch etc. for an operator to slide the lamp cover by hand is not required on the surface of the lamp cover, thereby improving appearance thereof.

In the projector of the present invention, the lamp cover may preferably be disposed on a top surface of the exterior case.

In the conventional arrangement, the lamp cover is usually disposed on the bottom side of the exterior case and the projector has to be turned upside down in order to detach the lamp cover. Accordingly, the attitude of the projector relative to a screen has to be re-adjusted after detaching the lamp cover and completing exchange work of the light source, so that exchange work can be troublesome. Especially, when a projector is used in an audio-visual room etc., the projector is often attached on ceiling with the ceiling surface and the bottom side of the exterior case being opposed. Accordingly, in order to exchange the light source, the projector has to be once detached from the ceiling before exchanging work, thus making the work very troublesome.

In the present invention, since the lamp cover is disposed on the top surface of the exterior case, when the light source is exchanged, exchange work can be conducted while the top surface of the projector is facing upward (i.e. in an ordinary attitude for a projector to be used in, for instance, installing the projector on a table) and it is not necessary to turn the projector upside down. Accordingly, re-adjustment of the attitude and position of the projector is not necessary after exchanging the light source, thereby further enhancing the workability in exchanging the light source.

Further, when the projector is attached on a ceiling, the lamp cover can be detached from the top surface facing downward, so that it is not necessary to detach the projector from the ceiling, thus further facilitating exchange work of the light source.

In the projector according to the present invention, the first biasing mechanism may preferably be formed by a part of an elastically deformable shield plate provided in the exterior case.

According to the above arrangement, since an independent component for constructing the first biasing mechanism is not necessary, the number of components can be reduced.

In the projector according to the present invention, a detector that detects attachment/detachment of the lamp cover to the exterior case may preferably be provided on the exterior case, the detector having a detection switch biased toward the lamp cover that is actuated being pressed by the lamp cover in a direction approximately opposite to biased direction thereof, the detector determining attachment/detachment of the lamp cover to the exterior case based on whether the detection switch is pressed by the lamp cover for a predetermined amount or not, and the first biasing mechanism may preferably also work as the detection switch of the detector.

Accordingly, since the first biasing mechanism is constructed using the detection switch of the detector, an independent component for constructing the first biasing mechanism is not necessary, so that the number of components can be reduced.

The first biasing mechanism may be composed only of the detection switch of the detector, may be composed only of a part of the shield plate, or may be composed of both of the elastic member of the detector and a part of the shield plate.

The means for biasing the detection switch to the lamp cover may be a means for biasing the detection switch by an elastic member formed of a spring, rubber etc., or the detection switch itself may be formed by an elastically deformable member and the force for returning to original shape may be used as the biasing force.

In the projector of the present invention, a shield covering an inner surface of the lamp cover may preferably be provided on the lamp cover, the shield being electrically conducted with a shield provided in the exterior case.

Accordingly, since the shield on the inner surface of the lamp cover and the shield in the exterior case are electrically conducted, the electric potential of the shields can be maintained equal, so that leakage of electromagnetic noise toward outside can be securely prevented.

Further, since the shield is provided on the inner surface of the lamp cover, heat radiation efficiency of the lamp cover can be enhanced and thermal deformation of the lamp cover can be prevented.

In the projector of the present invention, the engagement structure may preferably be located inside the exterior case.

According to the above arrangement, since the engagement structure between the lamp cover and the exterior case is disposed inside the exterior case, the engagement structure is not exposed to the outside, thereby improving appearance.

In the projector of the present invention, the operating portion may preferably be disposed at a position recessed toward inside of the exterior case.

Since the operating portion is disposed at a position recessed toward inside of the exterior case, erroneous touch on the operating portion to operate the operating portion in carrying and operating the projector can be prevented, thereby preventing unexpected fall-off of the lamp cover by erroneous operation.

In the projector of the present invention, a slide portion capable of sliding in the slide direction relative to the exterior case may preferably be formed on the lamp cover, a guide in slide contact with the slide of the lamp cover may preferably be formed at a periphery of the opening of the exterior case along the slide direction, a notch may preferably be formed in the intermediary of the guide of the exterior case, and the slide of the lamp cover may preferably be capable of being fitted into and detached from the exterior case.

Since the notch is formed in the intermediary of the guide and the slide of the lamp cover is capable of being fitted to and detached from the exterior case from the notch, the slide of the lamp cover can be fitted to and detached from the exterior case on the way of slide movement of the lamp cover relative to the exterior case, i.e. when the slide reaches the notch of the guide in attaching and detaching the lamp cover. Accordingly, the distance for the lamp cover to slide relative to the exterior case can be shortened, and the lamp cover can be attached and detached even when the projector is installed in a narrow space.

In the projector of the present invention, a second biasing mechanism that biases the lamp cover in a direction to be away from the exterior case along attaching and detaching direction of the slide may preferably be provided.

Accordingly, when the lamp cover is slid to reach the notch of the guide in detaching the lamp cover, the lamp cover is biased in a direction away from the exterior case by the second biasing mechanism, so that the slide of the lamp cover is detached from the guide of the exterior case, thereby facilitating attachment and detachment of the lamp cover.

In the projector of the present invention, the second biasing mechanism may preferably be formed by a part of elastically deformable shield plate provided in the exterior case and/or a part of elastically deformable shield plate covering an inner surface of the lamp cover.

According to the above arrangement, since the second biasing mechanism is composed of a part of shield plate provided in the exterior case and/or a part of shield plate covering an inner surface of the lamp cover, an independent component for constructing the second biasing mechanism is not necessary, so that the number of components can be reduced.

A projector according to another aspect of the present invention has a light source and an exterior case that accommodates the light source, the projector modulating, enlarging and projecting a light beam irradiated by the light source to form a projection image, the projector further including: an opening formed only on a top surface of the exterior case at a position corresponding to the light source; and a lamp cover that closes the opening, the lamp cover disposed only on the top surface of the exterior case and capable of being attached to and detached from the exterior case.

In the present invention, since the lamp cover is disposed on the top surface of the exterior case, when the light source is exchanged, exchange work can be conducted while the top surface of the projector is facing upward (i.e. in an attitude for a projector to be used such as installing the projector on a table) and it is not necessary to turn the projector upside down. Accordingly, re-adjustment of the attitude and position of the projector is not necessary after exchanging the light source, thereby further enhancing the workability in exchanging the light source.

Further, when the projector is attached on a ceiling, the lamp cover can be detached from the top surface facing downward, so that it is not necessary to detach the projector from the ceiling, thus further facilitating exchange work of the light source.

Since the lamp cover is disposed only on the top surface of the exterior case, the lamp cover does not interfere with the other components disposed on a side of the exterior case (such as exhaust hole for discharging exhaust from the cooling fan toward outside and a handle used for carrying the projector), so that freedom of design can be improved.

Further, since the lamp cover is disposed only on the top surface of the exterior case and is not extended to a side of the exterior case, the appearance can be improved.

In the projector of the present invention, an engagement structure that engages the lamp cover with the exterior case to attach the lamp cover to the exterior case and an operating portion that is operated to release the engagement structure may preferably be provided.

In a conventional projector, the lamp cover is usually screwed to the exterior case. Accordingly, in order to detach the lamp cover from the exterior case, a plurality of screws has to be unscrewed, which is very troublesome.

In the projector of the present invention, since the lamp cover is attached to the exterior case by the engagement structure and the operating portion for releasing the engagement structure is provided, the engagement of the lamp cover can be released by operating the operating portion. In other words, since the lamp cover can be detached from the exterior case with one touch, exchange work of the light source can be further facilitated.

In the projector of the present invention, the engagement structure may preferably be disposed inside the exterior case, and the operating portion may preferably be disposed away from the lamp cover.

Since the engagement structure of the lamp cover and the exterior case is disposed inside the exterior case and the operating portion is disposed away from the lamp cover, notch etc. for forming the engagement structure and the operating portion is not necessarily formed on the outer surface of the lamp cover exposed to the outside. Accordingly, the gap between the outer surface of the lamp cover exposed to the outside and the outer surface of the exterior case can be minimized, thus preventing light leakage of the light source from the gap and improving appearance.

In the projector of the present invention, the operating portion may preferably be disposed at a position recessed toward inside of the exterior case.

Since the operating portion is disposed at a position recessed toward inside of the exterior case, erroneous touch on the operating portion to operate the operating portion in carrying and operating the projector can be prevented, thereby preventing unexpected fall-off of the lamp cover by erroneous operation. Incidentally, the operating portion may not be the operation switch but may be arranged in other way as long as the engagement between the lamp cover and the exterior case can be released.

In the projector of the present invention, the engagement structure that engages the lamp cover with the exterior case may preferably be provided on the lamp cover, the engagement structure including a first engagement portion and a second engagement portion inserted and engaged with the exterior case, and the first engagement portion may preferably be inserted to the exterior case along a direction approximately parallel to the top surface and the second engagement portion may preferably be inserted to the exterior case along a direction approximately orthogonal with the top surface.

Since the first engagement portion and the second engagement portion inserted to the exterior in mutually different direction are provided to the lamp cover, detachment of the lamp cover from the exterior case becomes unlikely, thus securing attachment of the lamp cover to the exterior case.

In the projector of the present invention, a first biasing mechanism that biases the lamp cover in a direction opposite to inserting direction toward the exterior case of the second engagement portion of the lamp cover may preferably be provided.

Since the first biasing mechanism for biasing the lamp cover in a direction for the second engagement portions to be detached from the exterior case is provided, the second engagement portion can be pushed in a direction to be pulled out from the exterior case in accordance with releasing the engagement of the second engagement portion by the operating portion, so that the lamp cover can be easily detached from the exterior case, thereby facilitating detachment of the lamp cover.

In the projector of the present invention, shields respectively covering inner surface of the exterior case and inner surface of the lamp cover may preferably be provided, the first biasing mechanism may preferably be made of metal, and an end of the first biasing mechanism may preferably be in contact with the shield covering the inner surface of the exterior case and the other end may preferably be in contact with the shield covering the inner surface of the lamp cover when the lamp cover is attached to the exterior case.

Since the shield for covering the inner surface of the exterior case and the shield for covering the inner surface of the lamp cover are provided and the shield are electrically conducted by the first biasing mechanism, leakage of electromagnetic noise from the inside of the exterior case toward outside can be prevented.

Further, since the first biasing mechanism works both for biasing the lamp cover in a predetermined direction and for electrically connecting the shields, the number of components can be reduced.

In the projector of the present invention, a second biasing mechanism that biases the lamp cover in an inserting direction toward the exterior case of the first engagement portion of the lamp cover may preferably be provided.

According to the above arrangement, since the second biasing mechanism for biasing the lamp cover in a direction for the first engagement portion to be inserted to the exterior case is provided, the first engagement portion is not fallen off from the exterior case even when the engagement of the second engagement portion is released by the operating portion. Accordingly, the lamp cover is not detached simultaneously with releasing the engagement of the lamp cover, so that damage on the lamp cover caused by fall-off can be prevented when the projector is installed on a ceiling.

In the projector of the present invention, the lamp cover may preferably have an engagement portion for engaging the lamp cover with the exterior case while the lamp cover is slightly opened.

According to the above arrangement, since the slightly-opened condition of the lamp cover can be maintained by the engagement portion, the lamp cover is not detached simultaneously with releasing engagement of the lamp cover by the operating portion. Therefore, when the projector is attached on a ceiling, the fall-off of the lamp cover simultaneously with operation of the operating portion in detaching the lamp cover can be prevented, thereby preventing damage on the lamp cover by fall-off.

In the projector according to the present invention, a detector that detects attachment/detachment of the lamp cover to the exterior case may preferably be provided to the exterior case, and the detector may preferably be operated by the engagement portion of the lamp cover.

Since the detector for detecting attachment/detachment of the lamp cover to the exterior case is provided and the operation of the detector is conducted by the engagement portion of the lamp cover, it is not necessary to provide an independent component for operating the detector on the lamp cover, thereby reducing the number of the components. Further, since the detector for detecting attachment/detachment of the lamp cover to the exterior case is provided, attachment failure etc. of the lamp cover to the exterior case can be prevented.

DETAILED DESCRIPTION OF PREFERRED EMBODIMENT(S)

Figure 1:
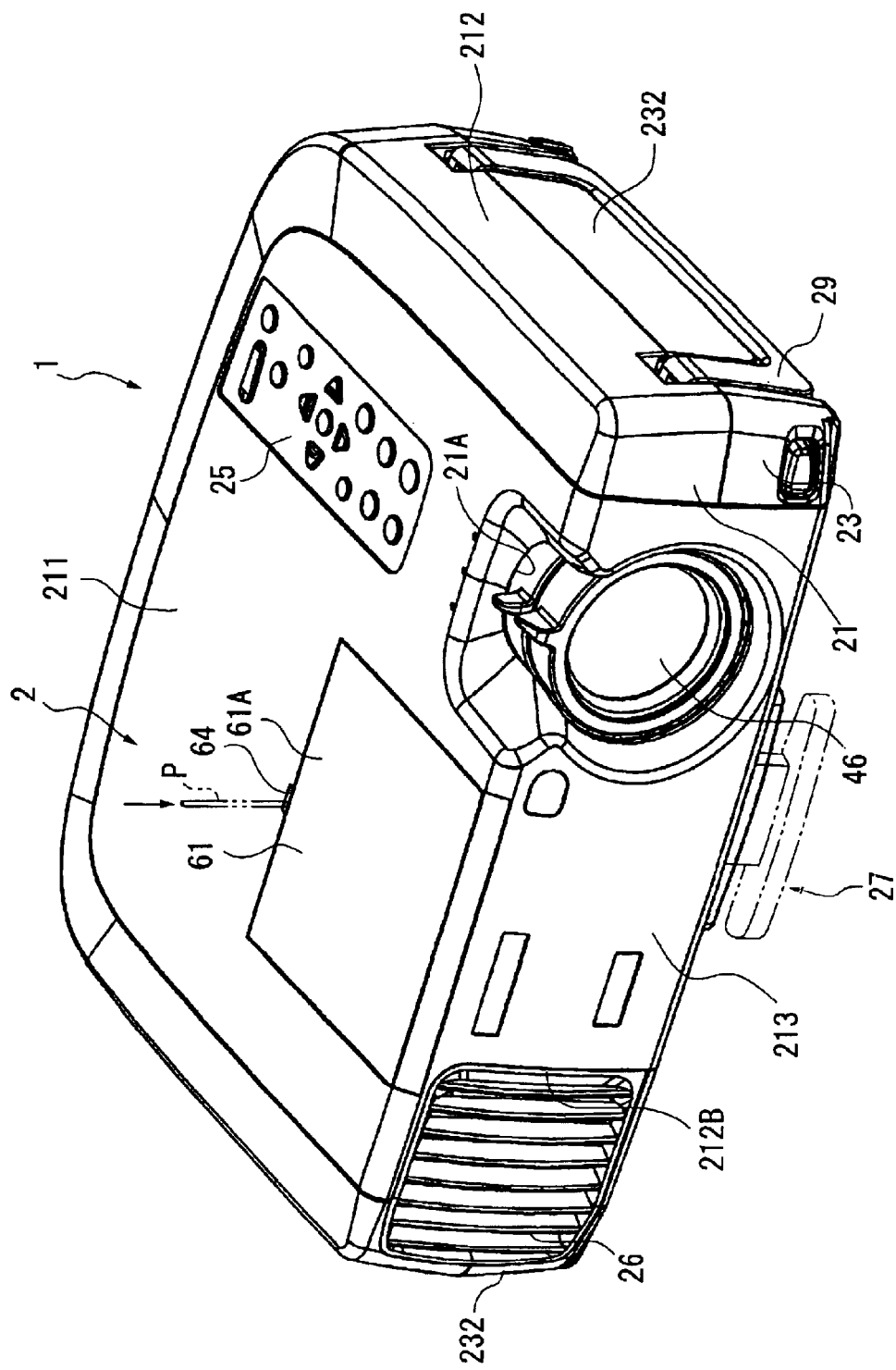
FIG. 1 is an entire perspective view of a projector seen from above according to a first embodiment of the present invention.
Figure 2:
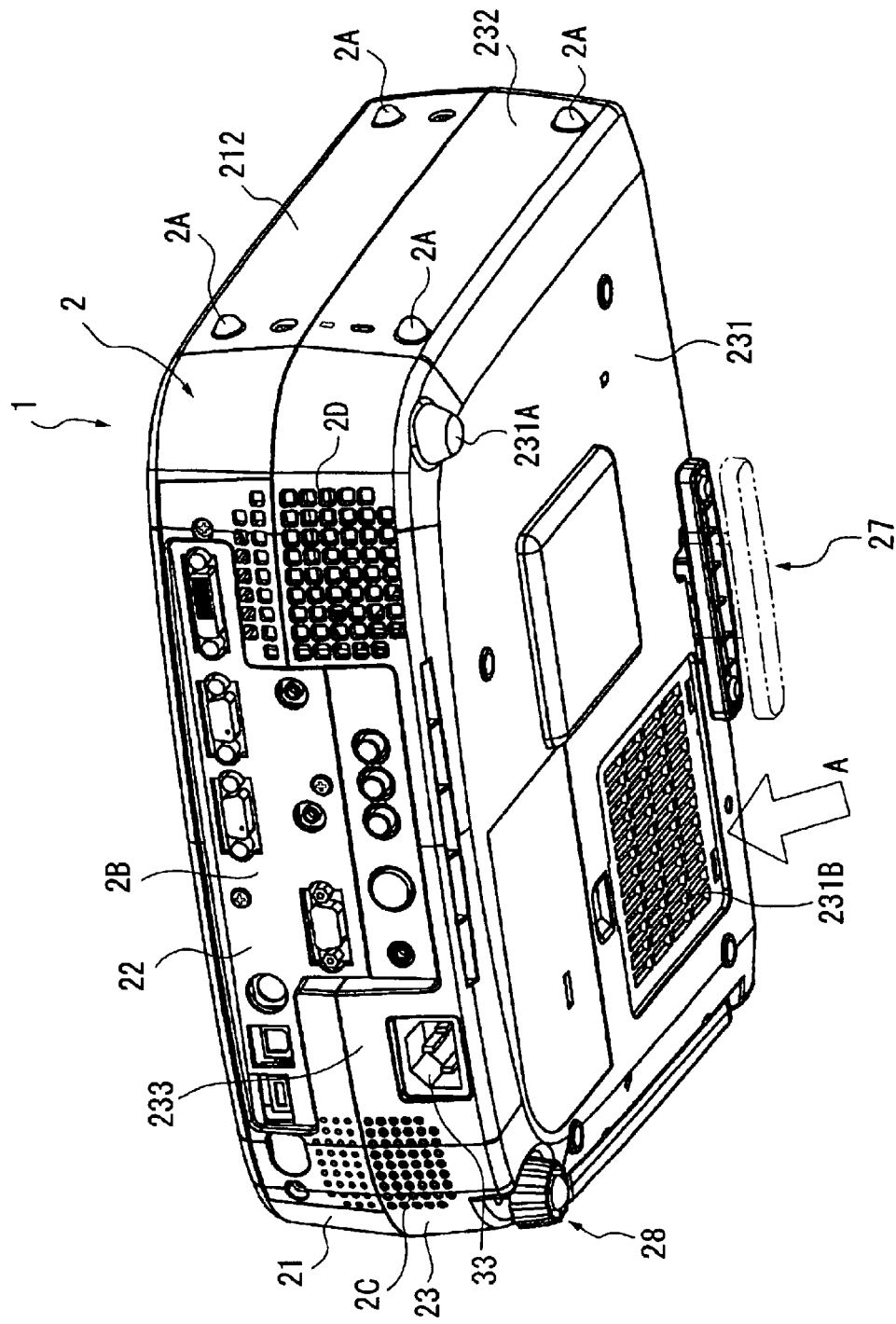
FIG. 2 is another entire perspective view of a projector seen from below according to the aforesaid first embodiment.
Figure 3:
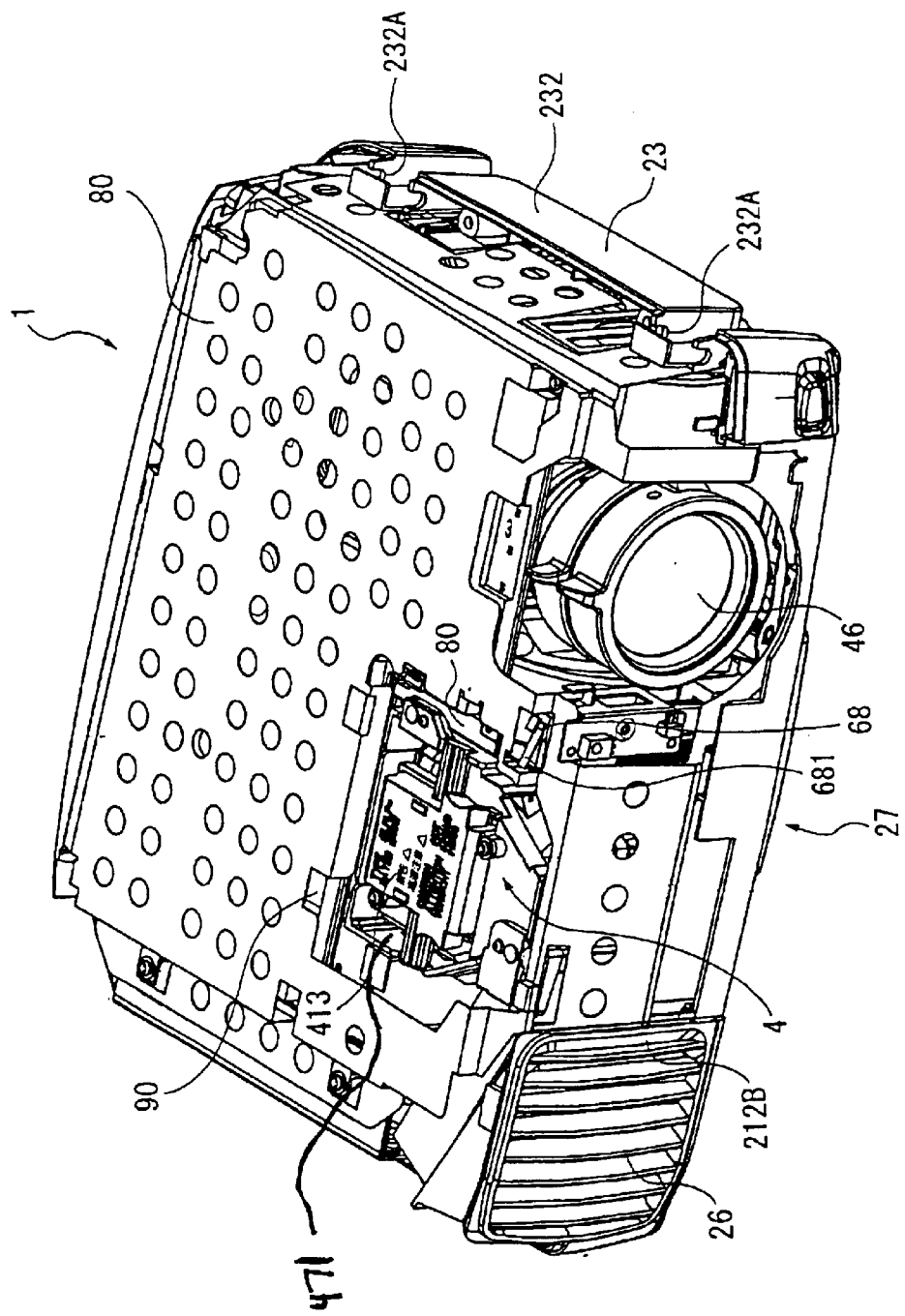
FIG. 3 is a perspective view showing a condition where an upper case is detached from the condition shown in FIG. 1.
Figure 4:
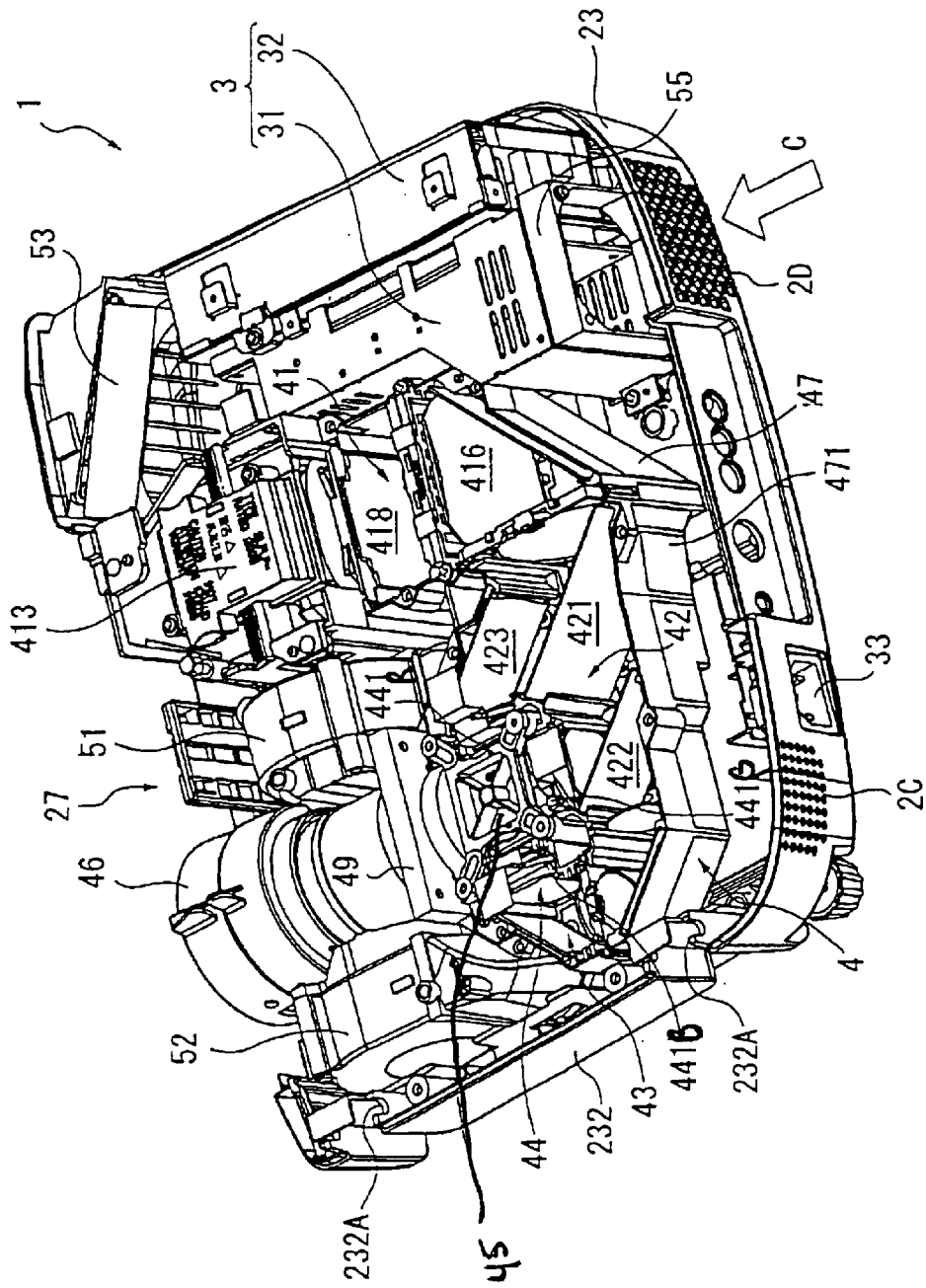
FIG. 4 is a perspective view seen from rear side with a shield plate, driver board and an upper light guide being removed from the condition shown in FIG. 3.
Figure 5:
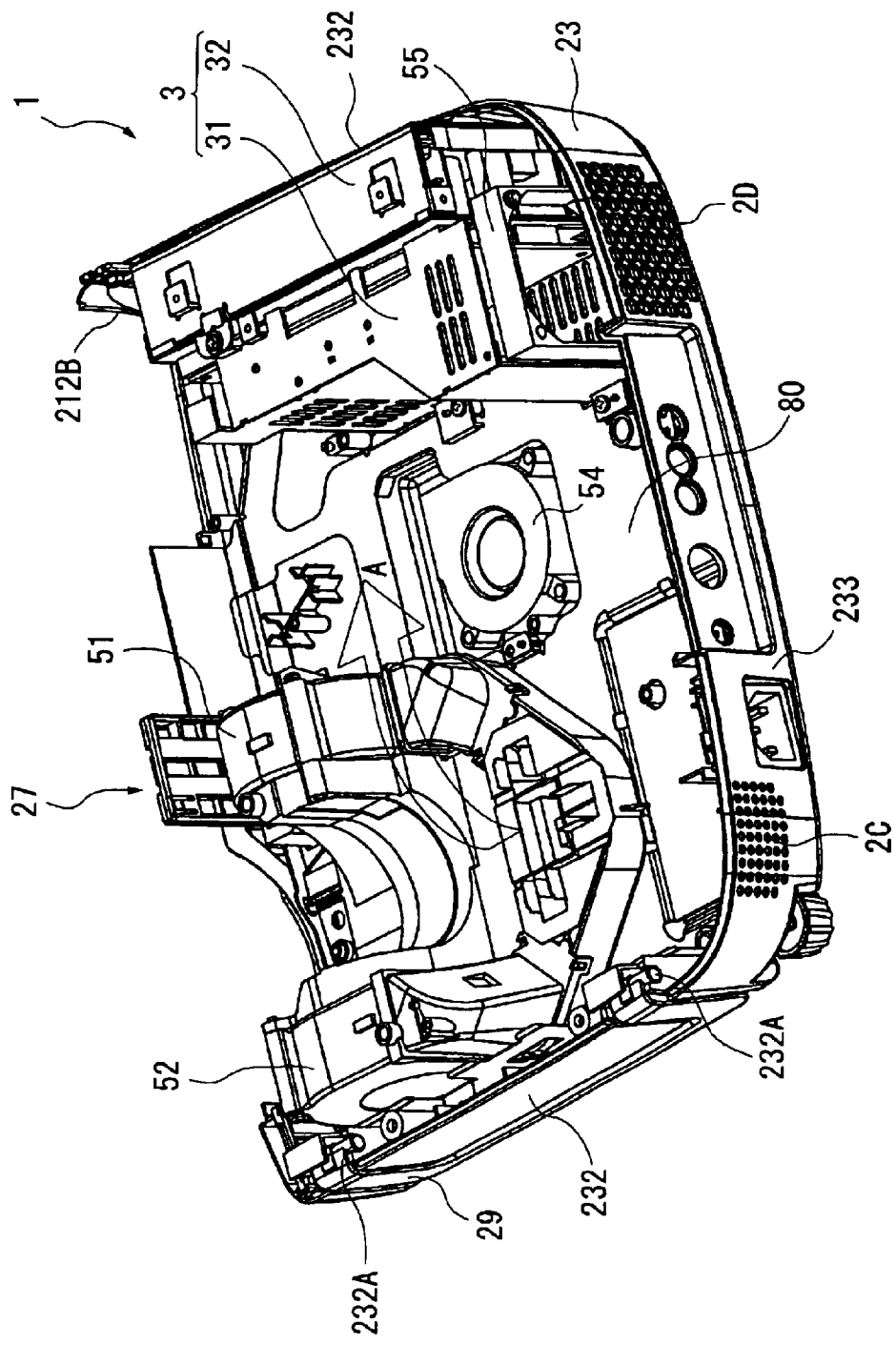
FIG. 5 is a perspective view showing a condition where an optical unit is detached from the condition shown in FIG. 4.

A first embodiment of the present invention will be described below with reference to attached drawings.
First Embodiment
1. Primary Arrangement of Projector FIG. 1 is an entire perspective view showing a projector 1 according to an embodiment of the present invention seen from above, FIG. 2 is an entire perspective view showing the projector 1 according to the aforesaid embodiment seen from below, and FIGS. 3 to 5 are perspective view showing an inside of the projector 1. Specifically, FIG. 3 is a perspective view showing the projector 1 of FIG. 1 with an upper case 21 being detached, FIG. 4 is a perspective view showing the projector 1 of FIG. 3 with a shield plate 80, a driver board 90 and an upper light guide 472 (shown in FIG. 6) being detached seen from rear side, and FIG. 5 is a perspective view showing the projector 1 of FIG. 4 with an optical unit 4 being detached. The components 4, 21, 80, 90 and 472 constituting the projector will be described below in detail.

In FIGS. 1 to 3, the projector 1 has an exterior case 2, a power source unit 3 accommodated in the exterior case 2 and a planar U-shaped optical unit 4 disposed in the exterior case 2 and the entirety thereof is formed in an approximately rectangular solid.

The exterior case 2 is composed of an upper case 21, a lower case 23 and an interface cover 22. The interface cover 22 is located at the back side of the projector 1.

The upper case 21 has an upper surface 211, a front surface 213 and a side surface 212 respectively constituting top side, front side and side of the projector 1.

A lamp cover 61 is detachably fitted on a front side of the upper surface 211. Incidentally, attachment structure of the lamp cover 61 to the upper case 21 will be described below in detail.

A notch 21A is provided on a side of the lamp cover 61 on the upper surface 211 extending from upper surface 211 to the front surface 213, where a projection lens 46 is disposed. The projection lens 46 is disposed in the notch 21A with upper surface thereof being exposed, so that zooming and focusing operations of the projection lens 46 can be manually conducted through a lever.

An exhaust hole 212B located at the front side of the inside power source unit 3 is provided to a side opposite to the projection lens 46 (notch 21A). An exhaust louver 26 for exhausting cooling air in a direction away from an image projection area, i.e. to the left side in FIG. 1, and for shielding light is provided to the exhaust hole 212B.

An operation panel 25 is provided on the back side of the notch 21A on the upper surface 211 of the upper case 21.

The lower case 23 includes a bottom surface 231, a side surface 232 and a rear surface 233 respectively constituting the bottom face, side face and rear face of the projector 1.

A first attitude adjusting mechanism 27 for adjusting inclination in front and back direction of the projector 1 to adjust position the projection image is provided on the front side of the bottom surface 231. A second attitude adjusting mechanism 28 for adjusting inclination of the projector 1 in right and left direction substantially orthogonal with the front and back direction is provided on one of the corners on the back side of the bottom surface 231. A rear foot 231A corresponding to the second attitude adjusting mechanism 28 incapable of adjusting position thereof is provided on the other corner.

An intake hole 231B of cooling air is provided on the bottom surface 231.

An attachment 232A for rotatably attaching a C-shaped handle 29 is provided on one of the side surfaces 232.

Side foots 2A (FIG. 2) to be a leg when the projector 1 is vertically situated with the handle 29 on the upside are provided on the respective side surfaces 212 and 232 of the upper case 21 and the lower case 23 on one side of the exterior case 2.

An interface 2B composed of a recess extending over the interface cover 22 and the back surface 233 of the lower case 23 is provided on the back side of the exterior case 2, and an interface board (not shown) with various connectors being mounted is disposed on the inner side of the interface 2B. A speaker hole 2C and an intake hole 2D are provided extending on both sides of the interface 2B extending over the interface cover 22 and the back side 233 of the lower case 23. The intake hole 2D is located on the back side of the inside power source unit 3.

As shown in FIG. 4, the power source unit 3 is composed of a power source 31 and a lamp driving circuit (ballast) 32 located on the side of the power source 31.

The power source 31 supplies the electric power supplied through a power cable to the lamp driving circuit 32 and the driver board 90 (FIG. 3) etc. and includes an inlet connector 33 (FIG. 2) for the power cable to be plugged.

The lamp driving circuit 32 supplies the electric power to a light source lamp 411 of the optical unit 4.

Figure 6:
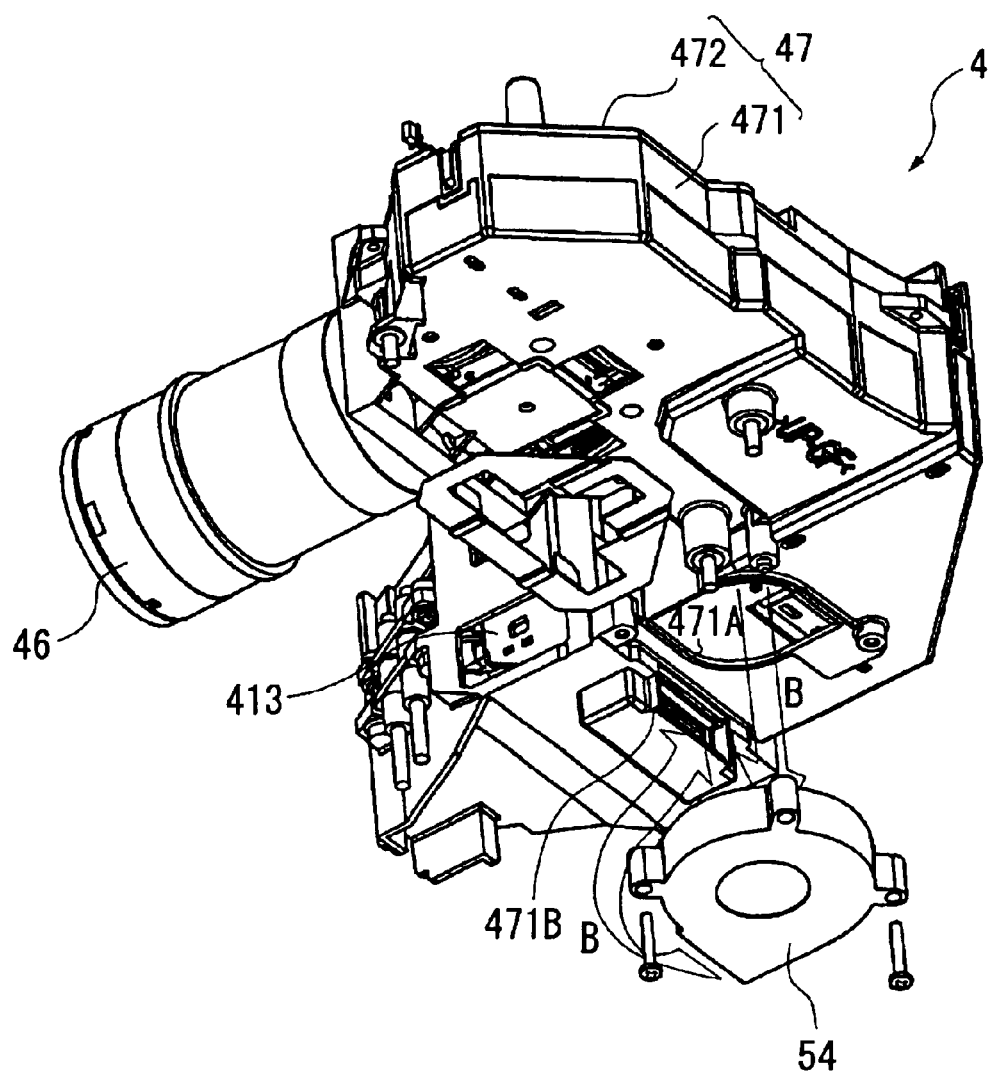
FIG. 6 is a perspective view seen from below showing the optical unit according to the aforesaid first embodiment.
Figure 7:
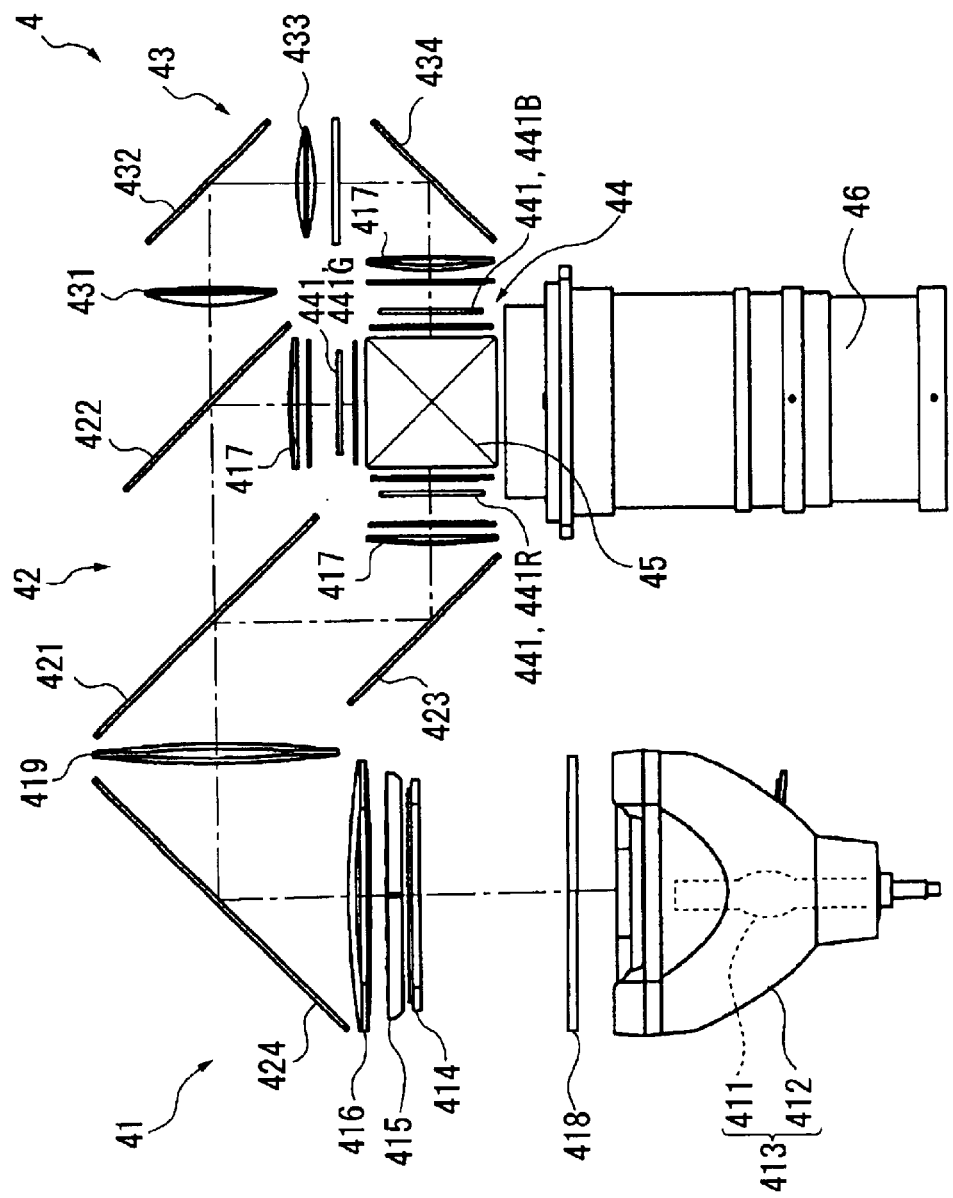
FIG. 7 is a plan view schematically showing the optical unit according to the aforesaid first embodiment.

As shown in FIGS. 4, 6 and 7, the optical unit 4 optically processes the light beam irradiated by the light source lamp 411 to form an optical image corresponding to the image information which includes an illuminating optical integrator system 41, a color separating optical system 42, a relay optical system 43, an electric optical device 44, a cross dichroic prism 45 (FIG. 7) as a color combining optical system and the projection lens 46 as a projection optical system.

The power source unit 3 and the optical unit 4 are covered with the surrounding (including upper and lower sides) aluminum shield plate 80 (FIGS. 3 and 5), thereby preventing electromagnetic noise from leaking from the power source unit 3 etc. to the outside.

2. Detailed Arrangement of Optical System

In FIGS. 4 and 7, the illuminating optical integrator system 41 is an optical system for substantially uniformly illuminating the image formation areas of the three liquid crystal panels 441 (respectively represented as liquid crystal panels 441R, 441G and 441B for each color light of red, green and blue), which includes a light source 413, a first lens array 418, a second lens array 414, a polarization converter 415, a first condenser lens 416, a reflection mirror 424 and a second condenser lens 419.

The light source 413 has the light source lamp 411 as a radial light source for emitting radial light beam and a reflector 412 for reflecting the radial light emitted from the light source lamp 411. A halogen lamp, a metal halide lamp, or a high-pressure mercury lamp is often used as the light source lamp 411. A parabolic mirror is used as the reflector 412, however, as well as a parabolic mirror, an ellipsoidal mirror and a parallelizing lens (concave lens) may be used.

The first lens array 418 has a matrix arrangement of lenses having substantially rectangular profile viewed from optical axis direction. The respective lenses split the beam emitted from the light source lamp 411 into a plurality of sub-beams. The profile of the respective lenses is approximately similar to the configuration of the image formation area of the liquid crystal panel 441. For instance, when the aspect ratio (ratio of horizontal and vertical dimensions) of the image formation area of the liquid crystal panels 441 is 4:3, the aspect ratio of the respective lenses is also set as 4:3.

The second lens array 414 has approximately the same arrangement as the first lens array 418, where the lenses are disposed in matrix. The second lens array 414 as well as the first condenser lens 416 and the second condenser lens 419 focuses the image from the respective lenses of the first lens array 418 onto the liquid crystal panel 441.

The polarization converter 415 is disposed between the second lens array 414 and the first condenser lens 416 and is integrated with the second lens array 414 as a unit. The polarization converter 415 converts the light from the second lens array 414 to a single polarized light in order to enhance light utilization efficiency in the electric optical device 44.

Specifically, the respective sub-beams converted into single polarized light by the polarization converter 415 are substantially superposed on the liquid crystal panels 441R, 441G and 441B of the electric optical device 44 by the first condenser lens 416 and the second condenser lens 419. Since a projector 1 using the liquid crystal panel 441 for modulating polarized light can use only single polarized light, approximately half of the light with random polarizations directions from the light source lamp 411 cannot be used.

Accordingly, in the projector 1, by using the polarization converter 415, all of the light emitted from the light source lamp 411 is converted into single polarized light to enhance light utilization efficiency in the electric optical device 44. Incidentally, such polarization converter 415 is disclosed in, for instance, Japanese Patent Laid-Open publication No. Hei 8-304739.

The color separating optical system 42 has two dichroic mirrors 421 and 422 and a reflection mirror 423, where the mirrors 421 and 422 separate the plurality of sub-beams irradiated from the illuminating optical integrator system 41 into three color lights of red, green and blue.

The relay optical system 43 includes an incident-side lens 431, a relay lens 433 and reflection mirrors 432 and 434, which introduces blue light of the color lights separated by the color separating optical system 42 into the liquid crystal panel 441B.

At this time, the blue light component and the green light component of the light beam irradiated from the illuminating optical integrator system 41 are transmitted through the dichroic mirror 421 of the color separating optical system 42 and the red light component reflected by the dichroic mirror 421. The red light reflected by the dichroic mirror 421 is reflected by the reflection mirror 423, which reaches to the liquid crystal panel 441R for red-color through a field lens 417. The field lens 417 converts the respective sub-beams emitted from the second lens array 414 into a light beam parallel to central axis (main beam). The field lenses 417 provided in front of the other liquid crystal panels 441G and 441B function in the same manner.

In the blue light and the green light transmitted through the dichroic mirror 421, the green light is reflected by the dichroic mirror 422 to reach the liquid crystal panel 441G for green color through the field lens 417. On the other hand, the blue color transmits through the dichroic mirror 422 to pass the relay optical system 43 and reach the liquid crystal panel 441B for blue color through the field lens 417. Incidentally, the relay optical system 43 is used for the blue color in order to prevent decrease in utilization efficiency of light on account of light diffusion caused by longer length of the optical path of the blue light than the length of the optical path of the other color lights, in other words, in order to directly transmit the sub-beam incident on the incident-side lens 431 to the field lens 417.

The electric optical device 44 has the liquid crystal panels 441R, 441G and 441B as three optical modulators which, for instance, use a polysilicon TFT as a switching element. The color lights separated by the color-separating optical system 42 are modulated by the three crystal panels 441R, 441G and 441B in accordance with image information to form an optical image.

The cross dichroic prism 45 combines the images modulated by the three liquid crystal panels 441R, 441G and 441B to form a color image. Incidentally, a dielectric multilayer film for reflecting red light and another dielectric multilayer film for reflecting blue light are formed on the cross dichroic prism 45 along boundaries of the four right-angled prisms in an approximately X-shape, the dielectric multilayers combining three color lights. The color image combined by the prism 45 is irradiated from the projection lens 46 and is enlarged and projected on a screen.

The above-described respective optical components 41 to 45 are accommodated in a synthetic-resin-made light guide 47 as an optical component casing as shown in FIGS. 4 and 6.

The light guide 47 is composed of a lower light guide 471 provided with a groove for slidably fitting the above-described respective optical components 414 to 419, 421 to 424 and 431 to 434 from the above and lid-shaped upper light guide 472 for shutting an upper opening of the lower light guide 471.

A head portion 49 is formed on the light-emitting side of the light guide 47. The projection lens 46 is fixed on the front side of the head portion 49 and a prism 45 attached with the liquid crystal panels 441R, 441G and 441B is fixed on the back side thereof.

3. Cooling Mechanism

The projector 1 according to the present embodiment has a panel cooling system A mainly for cooling the liquid crystal panels 441R, 441G and 441B, a lamp cooling system B mainly for cooling the light source lamp 411, and a power source cooling system C mainly for cooling the power source 31.

In FIGS. 2, 4 and 5, a pair of silocco fans 51 and 52 located on both sides of the projection lens 46 are used in the panel cooling system A. The cooling air sucked in from the intake hole 231B on the lower side by the silocco fans 51 and 52 cools the liquid crystal panels 441R, 441G and 441B from the lower side to the upper side and subsequently comes close to an axial-flow exhaust fan 53 at the front corner while cooling the lower side of the driver board 90 (FIG. 3) to be exhausted from the exhaust hole 212B on the front side.

In FIGS. 4 to 6, a silocco fan 54 provided on the lower side of the optical unit 4 is used in the lamp cooling system B. The cooling air in the projector 1 drawn by the silocco fan 54 enters into the light guide 47 from an opening (not shown) provided on the upper light guide 472 and cools the unitized second lens array 414 and the polarization converter 415 while passing therethrough. Thereafter, the cooling air goes out from the exhaust opening 471A of the lower light guide 471 to be sucked and discharged by the silocco fan 54. The discharged cooling air again enters into the light guide 47 from the intake opening 471B of the lower light guide 471 and invades into the light source 413 to cool the light source lamp 411, and, subsequently, goes out of the light guide 47 to be exhausted from the exhaust hole 212B by the axial-flow exhaust fan 53.

In FIG. 4, an axial-flow intake fan 55 provided at the back side of the power source 31 is used in the power source cooling system C. The cooling air sucked in from the intake hole 2D at the back side by the axial-flow intake fan 55 cools the power source 31 and the lamp driving circuit 32. Subsequently, the cooling air is exhausted from the exhaust hole 212B by the axial-flow exhaust fan 53 in the same manner as the other cooling systems A and B.

4. Attachment Structure of Lamp Cover

In FIG. 1, the lamp cover 61 according to the present embodiment has a slidable attachment/detachment structure relative to the exterior case 2.

Figure 8:
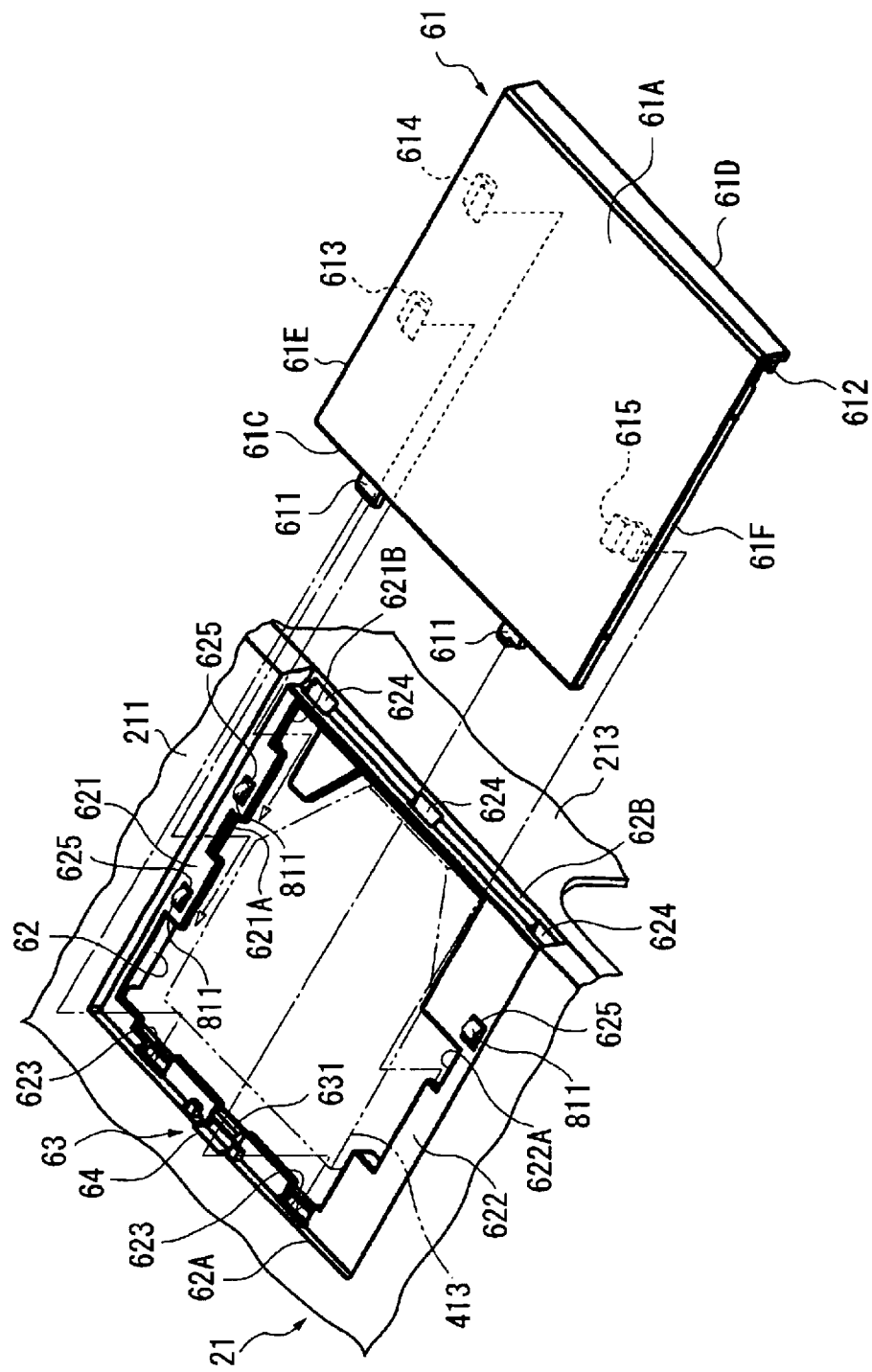
FIG. 8 is a perspective view showing an attachment structure of a lamp cover of the aforesaid first embodiment.

FIG. 8 shows the projector 1 with the lamp cover 61 being detached from the exterior case 2.

Outlining the attachment structure of the lamp cover 61, the lamp cover 61 is a lid for closing an opening 62 formed at the front side of the upper surface 211 of the upper case 21, which is formed in an approximately planar rectangular shape.

The opening 62 is located immediately above the light source 413 so that the light source 413 can be attached to and detached from the projector 1 through the opening 62. Among the peripheral edge of the openings 62 of the upper case 21, a pair of guides 621 and 622 are formed on a pair of peripheral edges provided along front and back direction of the projector 1. Incidentally, the guide 621 is located on the right side of the projector 1 seen from the front side thereof and the guide 622 is located on the left side thereof.

The lamp cover 61 is slidable relative to the upper surface 211 in front and back direction along the pair of guides 621 and 622 of the upper case 21.

The lamp cover 61 is fixed to the upper case with an engagement structure 63, the engagement structure 63 including a fitting 631 located at a periphery 62A at the hind side of the opening of the upper case 21.

Next, details of attachment structure of the lamp cover 61 will be described below.

The lamp cover 61 extends from the upper surface 211 to a portion between the upper surface 211 and the front surface 213 on the upper case 21.

Outer surface 61A of the lamp cover 61 is formed in a shape corresponding to the outer profile of the upper case 21 so that the lamp cover 61 is substantially flush with the upper surface 211 of the upper case 21 when the lamp cover 61 is attached to the upper case 21 (see FIG. 1).

Figure 9:
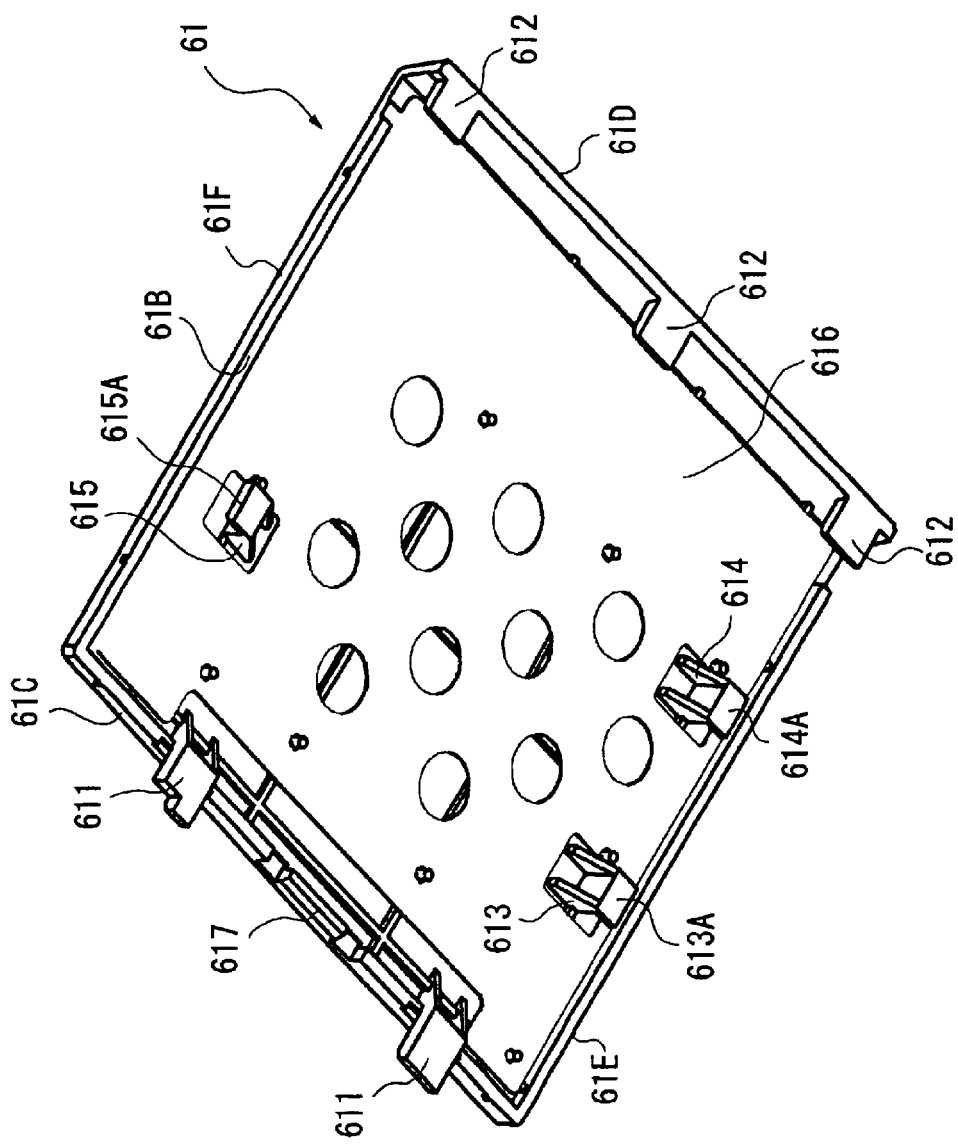
FIG. 9 is a perspective view seen from below showing the lamp cover according to the aforesaid first embodiment.

As shown in FIG. 9, a plurality of (two in the present embodiment) first insertions 611 to be inserted into the upper case 21, a plurality of (three in the present embodiment) second insertions 612, a plurality of (three in the present embodiment) slide portions 613, 614 and 615 in slide contact with the guides 621 and 622 of the upper case 21 and an engagement projection 617 engaged with the above-mentioned fitting 631 of the upper case 21 are formed on the inner surface 61B of the lamp cover 61 being integrated with the lamp cover 61.

The two first insertions 611 are provided along a hind side periphery 61C of the lamp cover 61 located rear side of the projector 1 when the lamp cover 61 is attached to the upper case 21. The first insertions 611 are respectively located adjacent to both ends of the hind side periphery 61C and are projected from the lamp cover 61 toward rear side of the projector 1 in substantially horizontal direction.

The three second insertions 612 are provided along a foresaid periphery 61D opposing a hind side periphery 61C of the lamp cover 61 on which the first insertions 611 are located. The second insertions 612 are located at approximate center and both ends of the fore side periphery 61D respectively and are projected in substantially horizontal direction toward rear side of the projector 1.

Among the three slide portions 613, 614 and 615, two slide portions 613 and 614 are disposed along a right periphery 61E of the lamp cover 61 disposed at the right side (right side when the projector 1 is seen from the front side) when the lamp cover 61 is attached to the upper case 21, with a predetermined interval. Remaining slide portion 615 is located along a left periphery 61F opposing the right periphery 61E of the lamp cover 61.

The slide portions 613 to 615 project downward from the inner surface 611B of the lamp cover 61 and respectively have claws 613A, 614A and 615A respectively engaging the upper case 21. Incidentally, in the present embodiment, the claws 613A and 614A of the slide portions 613 and 614 located on the right periphery 61E of the lamp cover 61 projects in substantially horizontal right direction to be capable of engaging with the guide 621 of the upper case 21. The claw 615A of the slide portion 615 located on the left periphery 61F of the lamp cover 61 projects in substantially horizontal left direction to be capable of engaging with the guide 622.

The engagement projection 617 engaging with the fitting 631 provided to the upper case 21 is located approximately at the center of the hind side periphery 61C of the lamp cover 61 to be projected downward.

A metal shield plate 616 is provided to the lamp cover 61 to cover the inner surface 61B thereof.

Back to FIG. 8, the upper side of the guides 621 and 622 formed on the upper case 21 is one stage lower than the outer surface of the upper case 21 so that, when the lamp cover 61 is attached to the exterior case 2, the periphery of the lamp cover 61 is supported by the upper side of the guides 621 and 622.

Two notches 621A and 621B are formed at the halfway of the guide 621 along longitudinal direction (front and back direction of the projector 1) and a notch 622A is formed at the halfway of the guide 622.

The notches 621A, 621B and 622A of the guides 621 and 622 are located corresponding to the position of the respective slides 613, 614 and 615. The distance between the notch 621A and the notch 621B of the guide 621 corresponds to the distance between the slide portion 613 and the slide portion 614 of the lamp cover 61.

The respective slide portions 613, 614 and 615 of the lamp cover 61 can be inserted to the respective notches 621A, 621B and 622A. After insertion, the lamp cover 61 is slid to the rear side of the projector 1 so that the claws 613A and 614A of the slide portions 613 and 614 are in slide contact with the lower side of the guide 621 and the claw 615A of the slide portion 615 is in slide contact with the lower side of the guide 622.

In the upper case 21, a first insertion hole 623 for the first insertion 611 of the lamp cover 61 to be inserted in approximately horizontal direction is formed on the hind side periphery 62A of the opening 62. On the other hand, a second insertion hole 624 for the second insertion 612 to be inserted in approximately horizontal direction is formed on the fore side periphery 62B of the opening 62. The number of the first insertion holes 623 and the second insertion holes 624 corresponds to the number of the first insertions 611 and the second insertions 612 and the position of the first insertion hole 623 and the second insertion hole 624 corresponds to the insertions 611 and 612.

Figure 10:
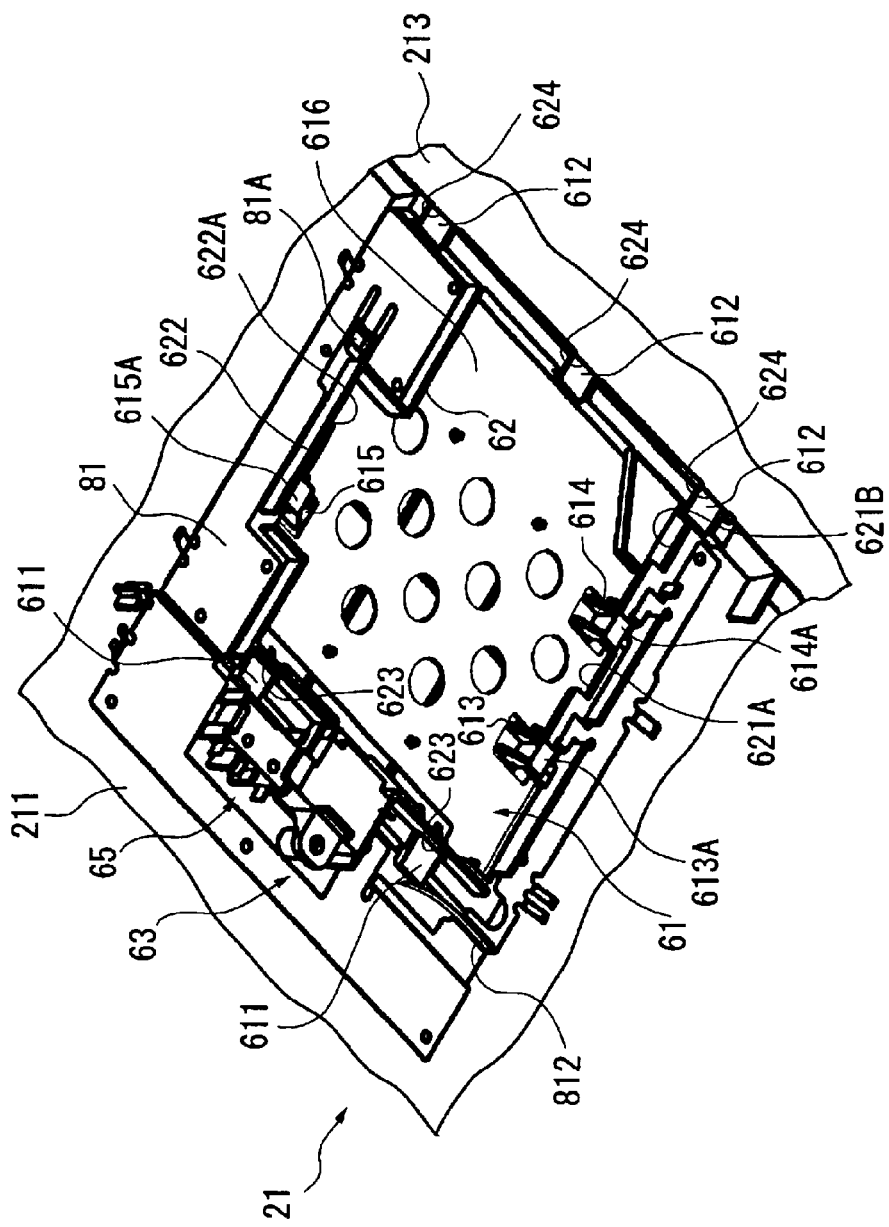
FIG. 10 is a perspective view seen from inside showing the upper case with the lamp cover of the aforesaid first embodiment being attached.

As shown in FIG. 10, a metal opening shield plate 81 covering surroundings of the opening 62 is provided inside the upper case 21, the opening shield plate 81 extending to the lower side of the guides 621 and 622.

A part of the opening shield plate 81 located on the lower side of the guides 621 and 622 is curved in approximate reverse U-shape, the curved portion 811 being exposed to the outside from a shield plate exposing hole 625 formed on the guides 621 and 622 of the upper case 21. Incidentally, the curved portion 811 of the opening shield plate 81 works as a biasing that biases the lamp cover 61 in a direction to be away from the upper case 21 along fitting/detaching of the slide. In other words, the curved portion 811 of the opening shield plate 81 is the second biasing mechanism of the first embodiment of the present invention.

The curved portion 811 of the opening shield plate 81 is provided in plural (three in the present embodiment) and a number of the shield plate exposing holes 625 corresponds to the number of the plurality of curved portions 811 are formed on the guides 621 and 622.

When the lamp cover 61 is attached to the exterior case 2, the curved portion 811 of the opening shield plate 81 is in contact with the shield plate 616 of the lamp cover 61, so that the opening shield plate 81 and the shield plate 616 of the lamp cover 61 are electrically conducted.

Incidentally, the opening shield plate 81 may be formed continuously with the shield plate 80 located on the inside of the upper case 21 or, alternatively, may be electrically conducted with the shield plate 80 through other component which is not shown. In short, it is only required that the opening shield plate 81 is electrically conducted with the shield plate 80.

Accordingly, when the lamp cover 61 is attached to the exterior case 2, the shield plate 616 of the lamp cover 61 and the shield plate 80 in the exterior case 2 are electrically conducted.

Figure 11:
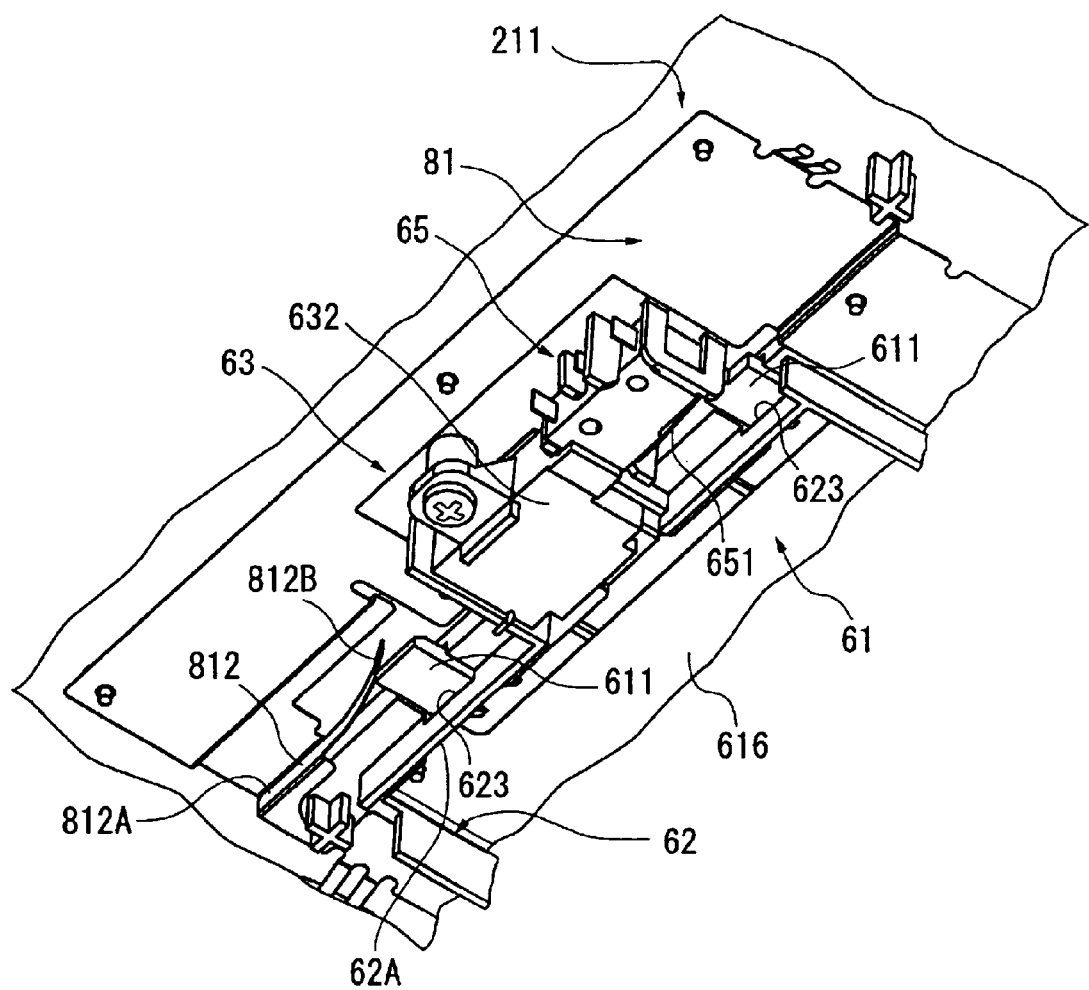
FIG. 11 is a perspective view enlarging a part of FIG. 10.
Figure 12:
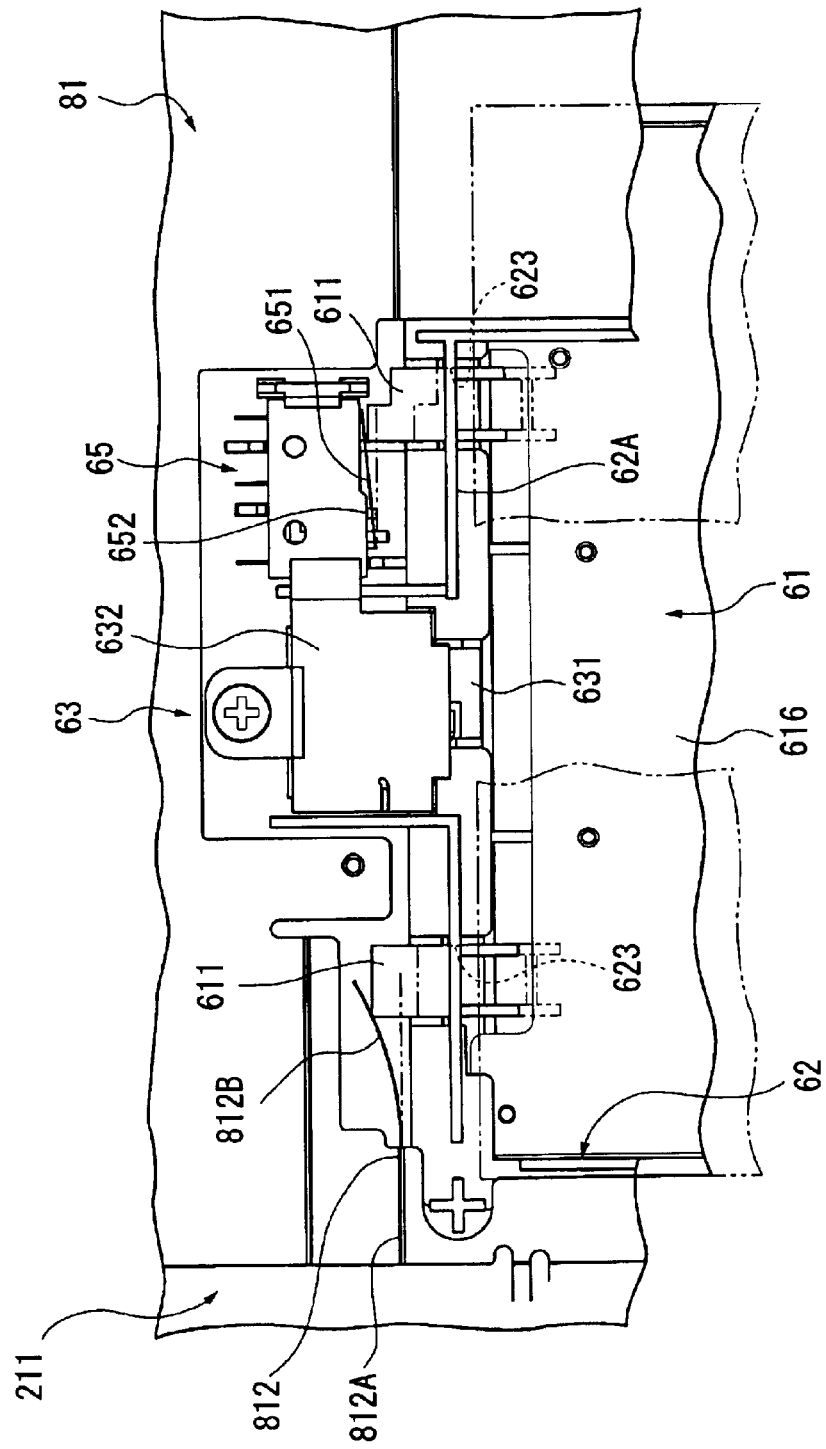
FIG. 12 is a plan view enlarging a part of FIG. 10.

As shown in FIGS. 11 and 12, a perpendicular surface 812 which is bent so that the surface direction is aligned approximately in perpendicular direction is formed at a part of the opening shield plate 81 located adjacent to one of the two first insertion holes 623 of the upper case 21 (in the present embodiment, the first insertion hole 623 located on the right side when the projector 1 is seen from a front side). Incidentally, the perpendicular surface 812 of the opening shield plate 81 works as a biasing that biases the lamp cover 61 along side direction thereof toward outside of the upper case 21. In other words, the perpendicular surface 812 of the opening shield plate 81 is the first biasing mechanism of the first embodiment of the present invention.

The perpendicular surface 812 is shaped in a long band along approximately horizontal direction and longitudinal direction thereof is substantially orthogonal with the slide direction of the lamp cover 61 (front and back direction of the projector 1). A base end 812A of the perpendicular surface 812 is continuous with the opening shield plate 81, and the distal end 812B is a free end.

When the lamp cover 61 is attached to the upper case 21, a tip of the first insertion 611 penetrating the first insertion hole 623 of the upper case 21 touches and presses the distal end 812B of the perpendicular surface 812.

The engagement structure 63 for fixing the lamp cover 61 to the upper case 21 includes an engagement projection 617 of the lamp cover 61, a fitting 631 to be engaged with the engagement projection 617 and a fitting housing 632 for accommodating the fitting 631 inside.

Figure 13A:
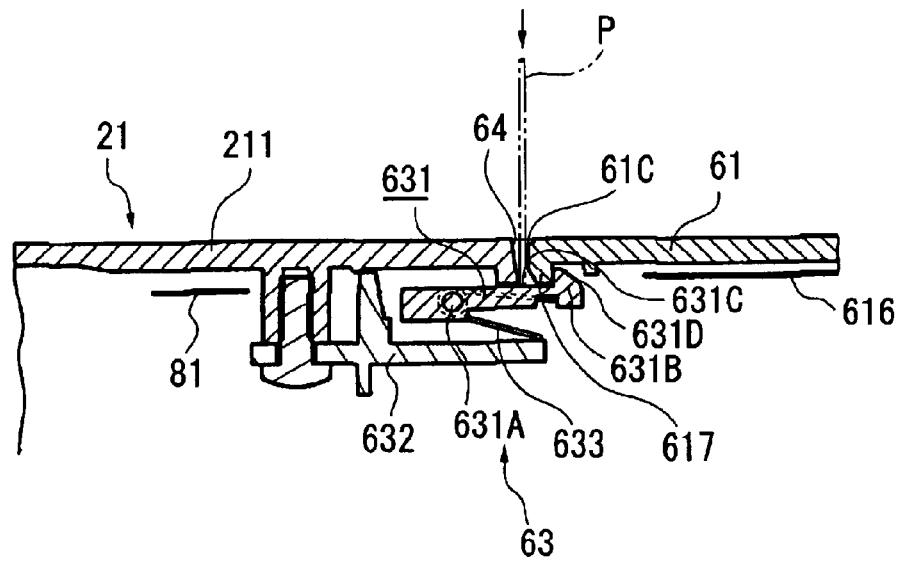
FIG. 13A is a cross section showing a primary portion of the lamp cover fixed to the upper case of the aforesaid first embodiment.

The fitting housing 632 is screwed to the lower side of the upper case 21. As shown in FIG. 13, a turning shaft 631A of the fitting 631 extending in approximately horizontal direction is supported inside the fitting housing 632 so that the fitting 631 is held in a manner capable of turning vertically.

A claw 631B to be engaged with the engagement projection 617 of the lamp cover 61 is formed on the fitting 631, the claw 631B being projected upward. A slanted surface 631D facing upward is formed on the claw 631B and the slanted surface 631D is inclined downward from the rear side toward front side of the projector 1.

A helical torsion coil spring 633 is interposed between the fitting 631 and the fitting housing 632, the helical torsion coil spring 633 biasing the claw 631B of the fitting 631 around the turning shaft 631A in upward direction.

On the upper surface 211 of the upper case 21, a notch hole 64 is formed at a position corresponding to a portion 631C between the turning shaft 631A and the claw 631B of the fitting 631 and an upper surface of the portion 631C of the fitting 631 is exposed to the outside from the notch hole 64.

In the fitting 631, when a pin member P (see double-dotted line in FIGS. 1 and 13) such as a tip of a mechanical pencil or a thin plate member such as a tip of a minus driver is inserted into the notch hole 64 of the upper case 21 to press the upper surface of the portion 631C of the fitting 631 downward, the claw 631B of the fitting 631 is turned downward around the turning shaft 631A being allowed by the helical coil spring 633.

Incidentally, the upper surface of the portion 631C of the fitting 631 is an operating portion of the present invention.

Back to FIGS. 11 and 12, a cover sensor 65 as a detector of the present invention is provided inside the exterior case 2. The cover sensor 65 is disposed around the other of the two first insertion holes 623 of the upper case 21 (in the present embodiment, the first insertion hole 623 located on the left side when the projector 1 is seen from the front side).

The cover sensor 65 is a sensor for detecting attachment/detachment of the lamp cover 61 to the exterior case 2, which works as a contact point that switches contact and isolation of an electric circuit (not shown) for electrically conducting the lamp driving circuit 32 of the power source unit 3 with the light source 413 in the present embodiment.

The cover sensor 65 has a metal lever 651 as an elastically-deformable detection switch and a push button 652 being in contact with the metal lever. The metal lever 651 has one fixed end and the other free end and is capable of turning around the fixed end by the elastic deformation caused when pressed. In such cover sensor 65, when the metal lever 651 is turned being pressed for more than a predetermined amount, the push button 652 is pressed for more than a predetermined amount so that the electric circuit between the lamp driving circuit 32 and the light source 413 are electrically conducted. When the metal lever 651 is not pressed for more than a predetermined amount, the push button 652 is not pressed for more than a predetermined amount to isolate the electric circuit between the lamp driving circuit 32 and the light source 413.

In such cover sensor 65, when the lamp cover 61 is attached to the upper case 21, the tip of the first insertion 611 penetrating the first insertion hole 623 of the upper case 21 touches and presses the free end of the metal lever 651.

Specifically, when the lamp cover 61 is attached to the exterior case 2, the metal lever 651 is pressed for more than a predetermined amount by the tip of the first insertion 611 of the lamp cover 61, the electric circuit between the lamp driving circuit 32 and the light source 413 is electrically connected. Accordingly, the light source lamp 411 of the light source 413 can be lit.

On the other hand, when the lamp cover 61 is detached from the exterior case 2 or when the lamp cover 61 is not securely attached to the exterior case 2, since the metal lever 651 of the cover sensor 65 is not sufficiently pressed by the tip of the first insertion 611, the electric circuit between the above-described lamp driving circuit 32 and the light source 413 is isolated. Accordingly, the light source lamp 411 of the light source 413 cannot be lit.

By providing the cover sensor 65, when the lamp cover 61 is forgot to be attached to the exterior case 2 or is not securely attached, the light source lamp 411 cannot be lit, so that attachment failure etc. of the lamp cover 61 can be prevented.

Next, attachment and detachment process of the lamp cover 61 to the exterior case 2 according to the present embodiment will be described below.

4.1. Attachment Process of Lamp Cover

Initially, the slide portions 613 to 615 of the lamp cover 61 are inserted to the notches 621A, 621B and 622A of the guides 621 and 622 of the upper case 21 from above.

Subsequently, the lamp cover 61 is slid from the fore side of the projector 1 toward rear side and the engagement projection 617 of the lamp cover 61 is brought into contact with the slanted surface 631D of the fitting 631.

Figure 13B:
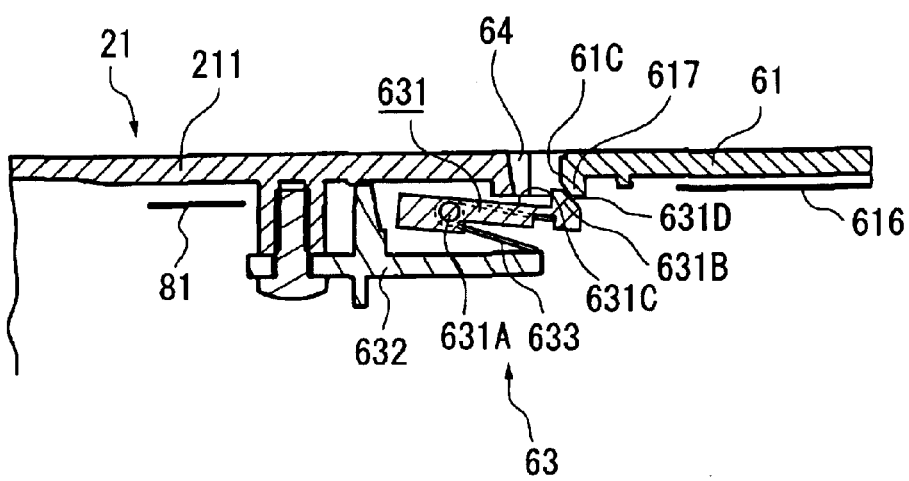
FIG. 13B is a cross section showing a primary portion of the lamp cover not fixed to the upper case of the aforesaid first embodiment.

When the lamp cover 61 is further slid from the fore side to the rear side, the engagement projection 617 of the lamp cover 61 presses the slanted surface 631D of the fitting 631, so that the claw 631B side of the fitting 631 is turned downward being allowed by the helical torsion coil spring 633 by the inclination of the slanted surface 631D (condition shown in FIG. 13(B)). Accordingly, the lamp cover 61 can be further slid from the fore side to the rear side.

When the lamp cover 61 is further slid from the fore side to the rear side and the engagement projection 617 of the lamp cover 61 is located deeper than the position of the claw 631B of the fitting 631, nothing presses the slanted surface 631D of the fitting 631, the fitting 631 is biased upward by the helical torsion coil spring 633. Accordingly, the engagement projection 617 of the lamp cover 61 is engaged with the claw 631B of the fitting 631, so that the lamp cover 61 is fixed to the upper case 21 (condition shown in FIGS. 1 and 13(A)).

When the lamp cover 61 is attached to the upper case 21, as described above, the shield plate 616 of the lamp cover 61 and the shield plate 80 of the exterior case 2 are electrically conducted by the curved portion 811 of the opening shield plate 81. The curved portion 811 of the opening shield plate 81 is pressed downward by the inner surface 61B of the lamp cover 61 to be elastically deformed.

Further, the distal end 812B side of the perpendicular surface 812 is elastically deformed from the foreside of the projector 1 to the depth side thereof by the first insertion 611 of the lamp cover 61. The metal lever 651 of the cover sensor 65 is pressed for more than a predetermined amount so that the electric circuit between the lamp driving circuit 32 and the light source 413 are electrically connected.

4.2. Detachment Process of Lamp Cover

Initially, a tip of a pin member P (or a thin plate member such as a minus driver) is inserted into the notch hole 64 formed on the upper case 21 to press the upper surface of the portion 631C of the fitting 631 downward. Accordingly, the claw 631B of the fitting 631 is turned downward being allowed by the helical torsion coil spring 633, so that the engagement between the engagement projection 617 of the lamp cover 61 and the claw 631B of the fitting 631 is released.

Then, the distal end 812B side of the perpendicular surface 812 of the opening shield plate 81 and the metal lever 651 of the cover sensor 65 are forced to recover the elastic deformation, the lamp cover 61 is biased to the foreside of the projector 1. Accordingly, the lamp cover 61 is slid from the depth side to the foreside, thereby slightly opening the lamp cover 61.

When the lamp cover 61 is slightly opened as described above, the slide portions 613 to 615 are in slide contact with the guides 621 and 622 of the upper case 21. Accordingly, even when the projector 1 is installed on a ceiling and the upper surface 211 is faced downward, the lamp cover 61 is kept being slightly opened. In other words, the fall-off of the lamp cover 61 caused when the engagement between the engagement projection 617 of the lamp cover 61 and the claw 631B of the fitting 631 is released can be avoided.

Thereafter, the lamp cover 61 is slid from the depth side to the foreside and the slide portions 613 to 615 reach the position of the notches 621A, 621B and 622A of the guides 621 and 622, the lamp cover 61 is biased in a direction to be away from the exterior case 2, i.e. upwardly, by the curved portion 811 of the opening shield plate 81 to detach the slide portions 613 to 615 from the guides 621 and 622, so that the lamp cover 61 can be detached from the exterior case 2.

(Advantage of First Embodiment)

According to the above-described present embodiment, following advantages can be obtained.

In the present embodiment, the engagement of the lamp cover 61 and the exterior case 2 is released by pressing the portion 631C of the fitting 631 downward by the pin member P, so that the lamp cover 61 is slid toward outside of the exterior case 2 along slide direction by the distal end 812B side of the perpendicular surface 812 of the opening shield plate 81 and the metal lever 651 of the cover sensor 65 to release the lamp cover 61 from being fixed to the exterior case 2.

Accordingly, unlike the conventional screw-fitting, the lamp cover 61 can be unfixed and detached from the exterior case 2 and with one action of pressing the portion 631C of the fitting 631 downward with the pin member P, workability for exchanging the light source 413 can be improved.

Further, the lamp cover 61 is arranged to, simultaneously with releasing engagement, slide toward the outside of the exterior case 2 by the distal end 812B side of the perpendicular surface 812 of the opening shield plate 81 and the metal lever 651 of the cover sensor 65, formation of anti slip, notch etc. (such as anti slip and notch formed on cell cover of a table clock and a remote controller) for sliding the lamp cover 61 with an operator's hand, is not required on the surface of the lamp cover 61, thereby improving appearance thereof.

Since the lamp cover 61 is formed on the upper surface 211 of the upper case 21, when the light source 413 is exchanged, exchange work can be conducted while the top surface of the projector 1 faces upward (in other words, the attitude in which the projector 1 is normally used in mounting the projector 1 on a table etc.) and there is no need for turning the projector 1 upside down unlike the conventional arrangement. Accordingly, re-adjustment of the attitude and position of the projector 1 is not necessary after exchanging the light source 413, so that the workability for exchanging the light source 413 can be further improved.

Even when the projector 1 is attached on a ceiling, the lamp cover 61 can be detached from the upper surface 211 of the upper case 21 facing downward, so that it is not necessary to detach the projector 1 from the ceiling and exchange work of the light source 413 can be easily conducted.

Since the lamp cover 61 is biased from the rear side to the fore side of the projector 1 by the distal end 812B side of the perpendicular surface 812 of the opening shield plate 81 and the metal lever 651 of the cover sensor 65, a separate component for biasing the lamp cover 61 from the rear side to the fore side is not necessary, thereby reducing the number of components.

Since the shield plate 616 of the lamp cover 61 is electrically conducted with the shield plate 80 and the opening shield plate 81 inside the exterior case 2 when the lamp cover 61 is attached to the exterior case 2, electrical potential of the shield plates 80, 81 and 616 can be maintained equal, so that leakage of electromagnetic noise from the power source unit 3 etc. toward the outside can be prevented.

Further, since the shied plate 616 is provided on the inner side of the lamp cover 61, heat radiation efficiency of the lamp cover 61 can be enhanced, thus preventing thermal deformation of the lamp cover 61.

Since the engagement structure 63 between the lamp cover 61 and the exterior case 2 is disposed inside the exterior case 2, the engagement structure 63 can be prevented from being exposed to the outside, so that appearance of the projector can be improved.

Since the fitting 631 is disposed inside the exterior case 2 and the portion 631C of the fitting 631 pressed by the pin member P is exposed to the outside from the notch hole 64 formed on the upper case 21, erroneous operation caused by touching the portion 631C of the fitting 631 in carrying or operating the projector 1 can be prevented, thereby preventing unexpected fall-off of the lamp cover 61 by the erroneous operation.

Since the notches 621A, 621B and 622A are formed on the halfway of the guides 621 and 622 of the upper case 21 and the slide portions 613 to 615 of the lamp cover 61 are inserted and drawn out from the exterior case 2 from the notches 621A, 621B and 622A of the exterior case 21, the slide portions 613 to 615 can be inserted and drawn out from the exterior case 2 while sliding the lamp cover 61 relative to the exterior case 2. Accordingly, the distance of the lamp cover 61 to be slid relative to the exterior case 2 can be shortened, so that the lamp cover 61 can be attached/detached even when the projector 1 is installed in a narrow space.

Since the curved portion 811 of the opening shield plate 81 is exposed to the outside from the shield plate exposing hole 625 of the guides 621 and 622, when the lamp cover 61 is detached, the lamp cover 61 can be biased upward by the curved portion 811 of the opening shield plate 81. Accordingly, when the respective slide portions 613 to 615 reach the position of the notches 621A, 621B and 622A of the guides 621 and 622, the slide portions 613 to 615 are biased by the curved portion 811 of the opening shield plate 81 to be detached from the guides 621 and 622, so that the lamp cover 61 can be easily detached.

Since the second biasing mechanism for biasing the lamp cover 61 upward is composed of a part of the opening shield plate 81, independent component is not necessary for constructing the second biasing mechanism, thereby reducing the number of the components.

Modifications of First Embodiment

In the above-described embodiment, following modifications are included in the scope of the present invention.

The second biasing mechanism is not restricted to a part of elastically deformable shield plate provided inside the exterior case, but may be composed of a part of an elastically deformable shield plate covering the inner surface of the lamp cover or, alternatively, may be constructed using other elastic member etc.

The operating portion is not restricted to be disposed at a position recessed inside the exterior case, but may be projected from the outer surface of the exterior case.

The engagement structure for fixing the lamp cover to the exterior case may not be disposed inside the exterior case but may be exposed toward the outside.

The first biasing mechanism is not restricted to be composed of a part of the shield plate inside the exterior case or an elastic member of a detector, but may be composed of other independent elastic member.

The shield provided on the inner surface of the lamp cover and inside the exterior case is not restricted to have a plate-shape, but may be formed on the inner surface of the lamp cover and the exterior case by vacuum evaporation.

The projector of the present invention may not use the liquid crystal panel as an optical modulator, but may have an optical modulator other than the liquid crystal such as a device using plasma element and a micro mirror, a reflection-type optical modulator having the same light-incident surface and the light-emitting surface, a single-plate type, a double-plate type or a rear-type. In other words, the arrangement can be designed at will in implementing the present invention as long as a projector modulates a light beam irradiated by a light source lamp in accordance with image information to form an optical image for enlarging and projecting the optical image.

Second Embodiment

Next, second embodiment of the present invention will be described below.

Though the lamp cover 61 is attached/detached in a slidable manner in the first embodiment, the lamp cover 61 is attached/detached by fitting-in in the second embodiment. Accordingly, the respective components of the projector 1 except for the surroundings of the lamp cover 61 are common to the above-described first embodiment and repeated explanation for (1. primary arrangement of projector), (2. detailed arrangement of optical system) and (3. cooling system) is omitted and description in place of (4. attachment structure of lamp cover) will only be described below.

5. Different Attachment Structure of Lamp Cover

Figure 14:
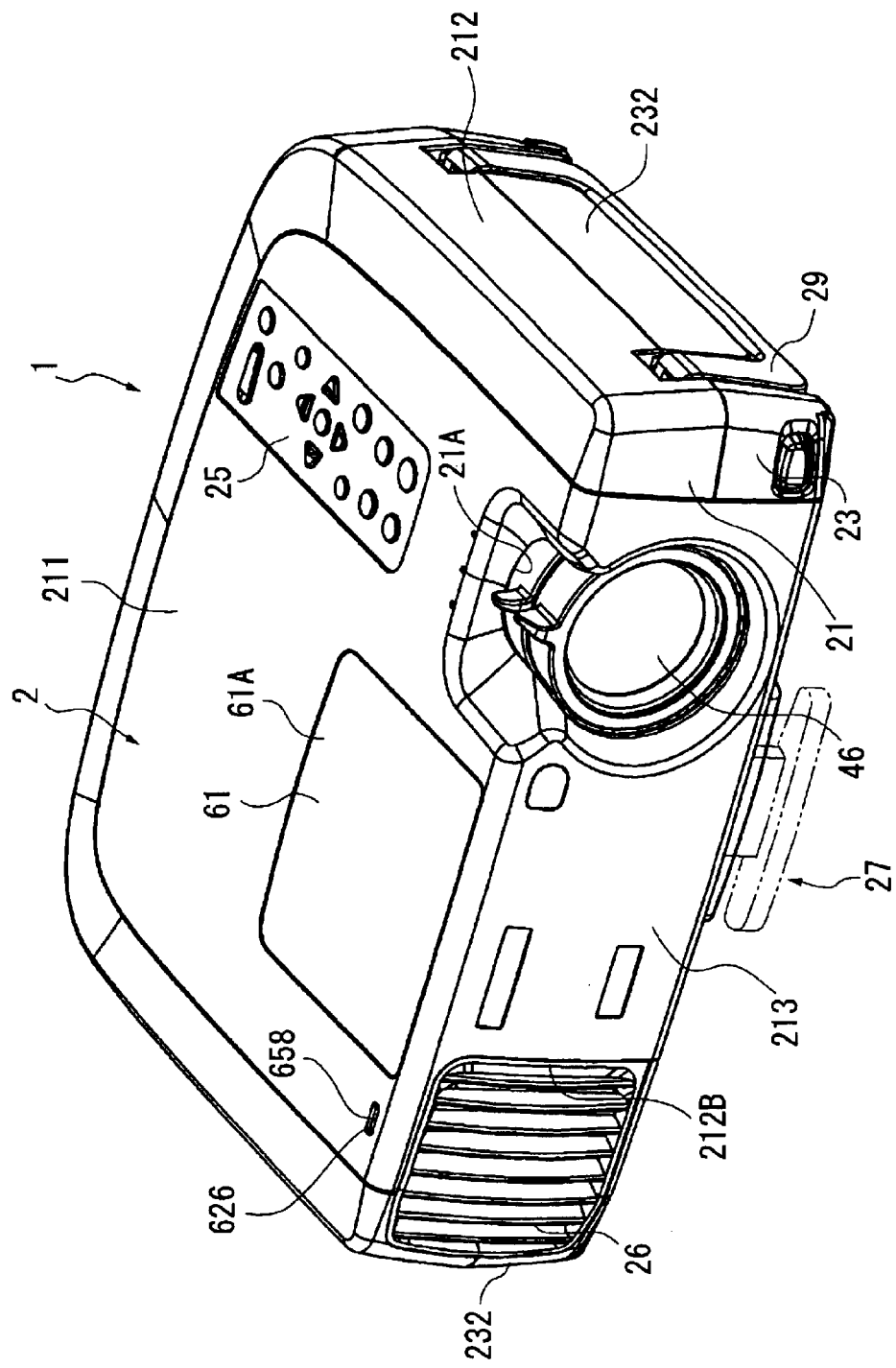
FIG. 14 is an entire perspective view seen from above showing a projector according to a second embodiment of the present invention.

In FIG. 14, the upper case 21 includes an upper surface 211, a front surface 213 and a side surface 212 respectively constituting the top face, the front face and side face of the projector 1.

The lamp cover 61 is attachable/detachable by being fitted in on a front side of the upper surface 211, and an operation switch 658 as an operating portion for releasing the lock of the lamp cover 61 is provided at a position remote from the lamp cover 61. The operation switch 658 is located inside the exterior case 2, to which outside operation is possible by a switch bole 626 formed on the upper case 21.

Figure 15:
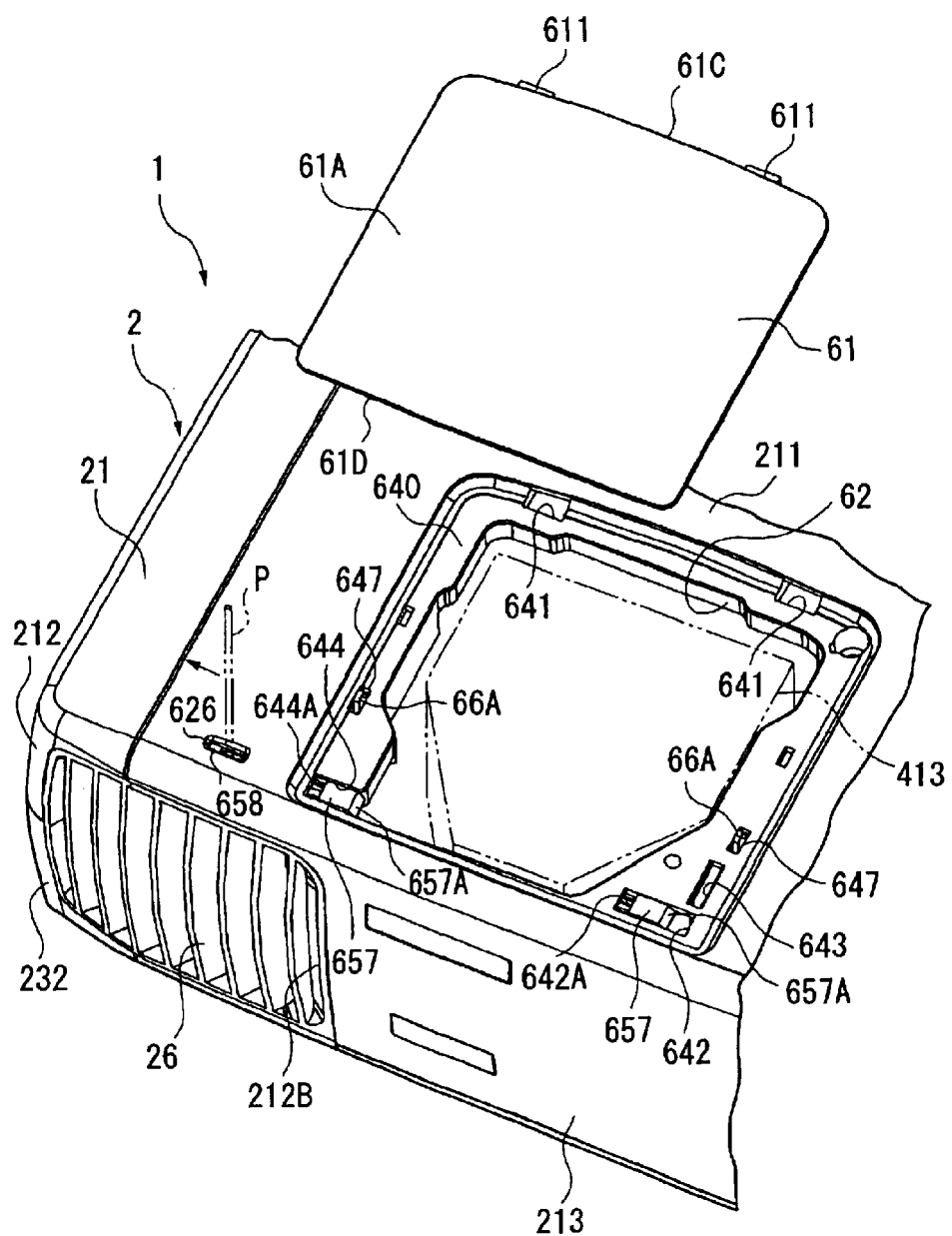
FIG. 15 is a perspective view showing an attachment structure of a lamp cover of the second embodiment of the present invention.

FIG. 15 shows a projector 1 with the lamp cover 61 being detached from the exterior case 2.

The lamp cover 61 is a lid for closing the opening 62 formed on the front side of the upper surface 211 of the upper case 21, which is formed in an approximately planar rectangular shape. The opening 62 is disposed immediately above the light source 413 and the light source 413 can be attached to and detached from the projector 1.

The outer surface 61A of the lamp cover 61 is formed in a smooth plane corresponding to the configuration of the outer surface of the upper surface 211 so that the lamp cover 61 becomes approximately flush with the upper surface 211 of the upper case 21 when the lamp cover 61 is attached to the upper case 21 (see FIG. 14).

Figure 16:
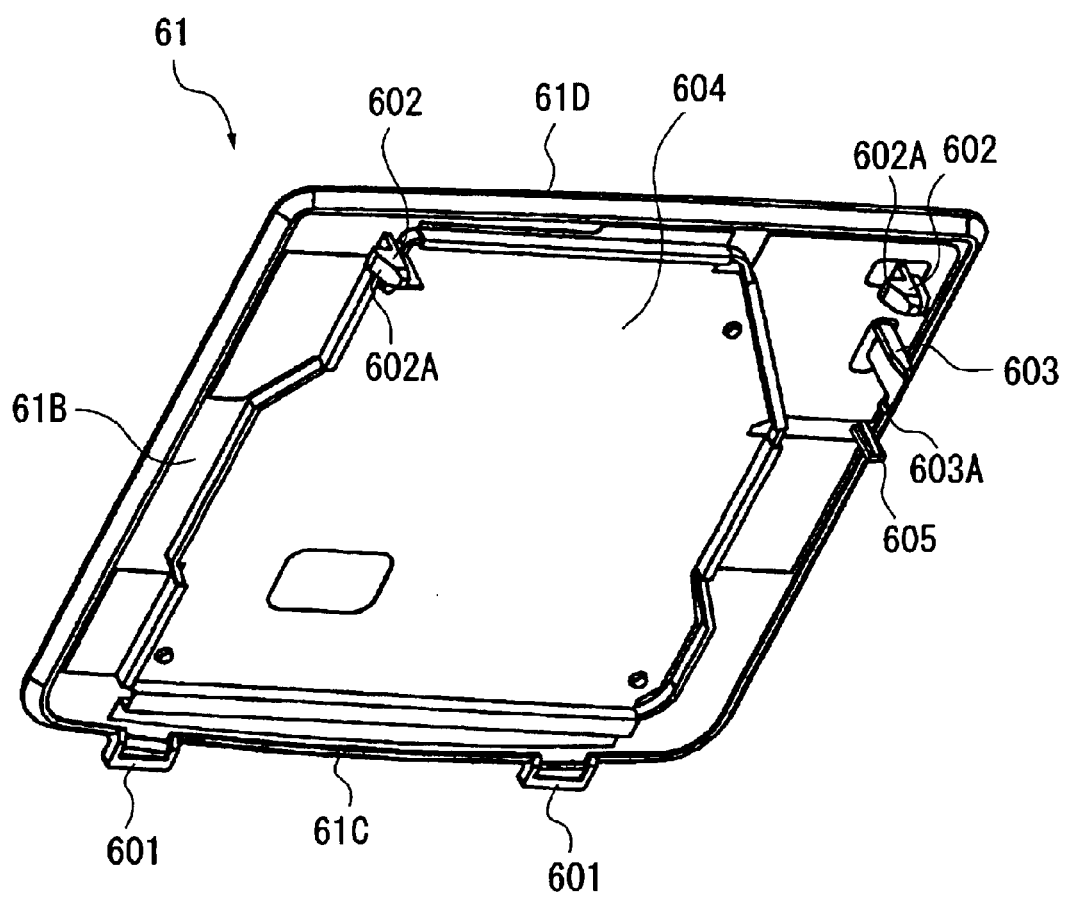
FIG. 16 is a perspective view seen from below showing the lamp cover according to the aforesaid second embodiment.

As shown in FIG. 16, a plurality of (two in the present embodiment) first engagement portion 601 and a plurality of (two in the present embodiment) second engagement portion 602 to be inserted to and engaged with the upper case 21, an engagement portion 603 to be engaged with the upper case 21 when the lamp cover 61 is slightly opened, and a projection 605 located adjacent to the engagement portion 603 are provided on an inner surface 61B of the lamp cover 61.

The two first engagement portions 601 are provided along a hind side periphery 61C of the lamp cover 61 located on the rear side of the projector 1 when the lamp cover 61 is attached to the upper case 21. The first engagement portions 601 are located respectively on both ends of the hind side periphery 61C and projects in approximately horizontal direction from the lamp cover 61 to the rear side of the projector 1.

Two second engagement portions 602 are provided along a fore side periphery 61D opposing the foreside periphery 61C of the lamp cover 61 to which the first engagement portion 601 is located. The second engagement portions 602 are respectively located on both ends of the fore side periphery 61D and project downward from the lamp cover 61. The second engagement portion 602 has a claw 602A formed in an approximate hook shape to be engaged to the upper case 21.

The engagement portion 603 is located adjacent to the second engagement portion 602 and projects downward from the lamp cover 61. The engagement portion 603 has a claw 603A formed in an approximate hook shape to be engaged to the upper case 21.

The projection 605 projects downward from the lamp cover 61.

The first engagement portion 601, the second engagement portion 602, the engagement portion 603 and the projection 605 are integrated with the lamp cover 61.

A shield plate 604 covering the inner surface 61B is provided on the lamp cover 61.

Back to FIG. 15, a step portion 640 around the opening 62 of the upper case 21 is formed by carving the outer surface of the upper surface 211 in an approximate rectangular configuration (a shape corresponding to planar profile of the lamp cover 61) to be one stage lower than the outer surface, so that, when the lamp cover 61 is attached to the exterior case 2, the periphery of the lamp cover 61 is supported by the upper surface of the step portion 640.

The step portion 640 is formed only on the upper surface 211 of the upper case 21 and is not formed on the front surface 213 and the side surface 212.

The step portion 640 has a first engagement hole 641 for the first engagement portion 601 of the lamp cover 61 to be inserted, a second engagement hole 642 for one of the two second engagement portions 602 (the second engagement portion 602 on the right side in FIG. 16) to be inserted, a second engagement notch 644 for the other of the two second engagement portions 602 (the second engagement portion 602 on the left side in FIG. 16) to be inserted, and an engagement hole 643 for the engagement portion 603 to be inserted.

Among them, the first engagement hole 641 is formed in a manner that the upper depth side thereof is covered with the upper case 21.

The first engagement hole 641, the second engagement hole 642, the second engagement notch 644 and the engagement hole 643 are located corresponding to respective positions of the first engagement portion 601, the second engagement portion 602 and the engagement portion 603 of the lamp cover 61.

Figure 17:
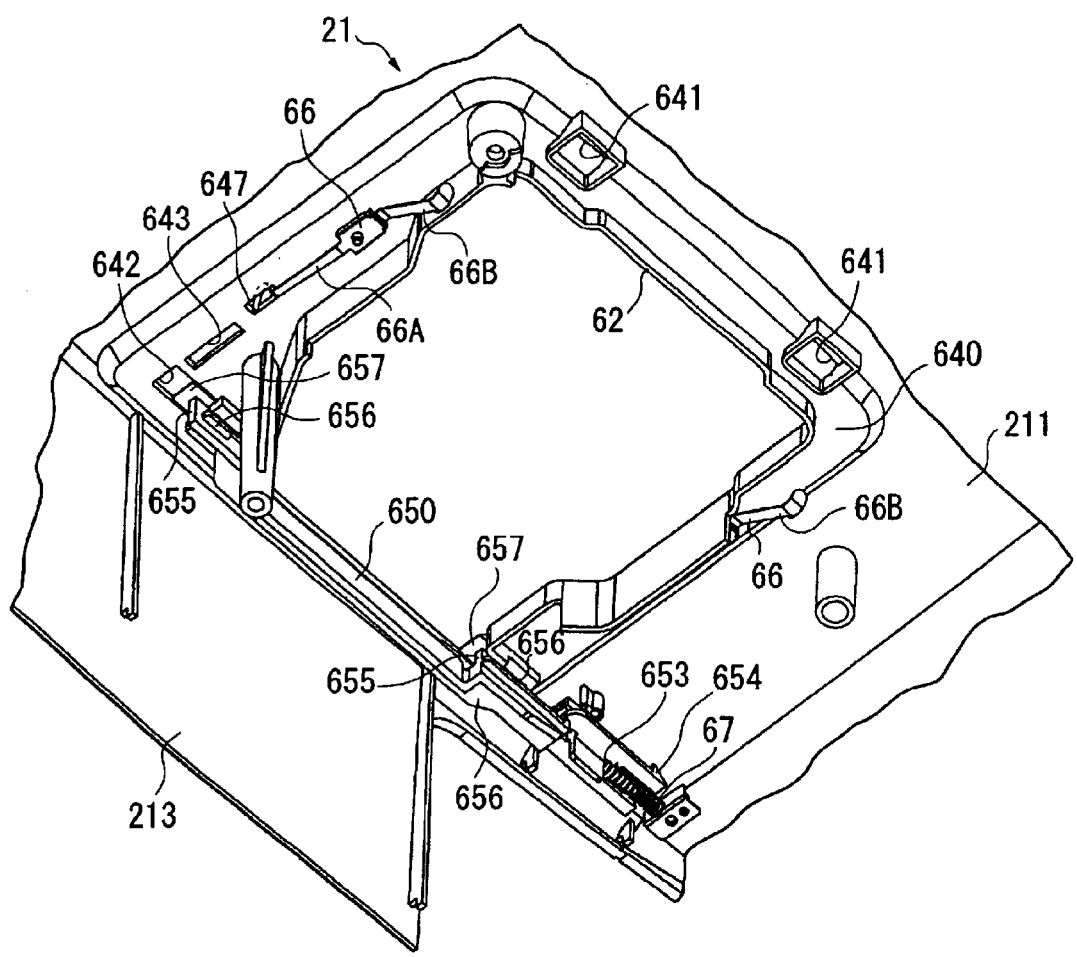
FIG. 17 is a perspective view seen from inside showing an upper case with the lamp cover being detached in the aforesaid second embodiment (attached with a lock lever and a plate spring)
Figure 18:
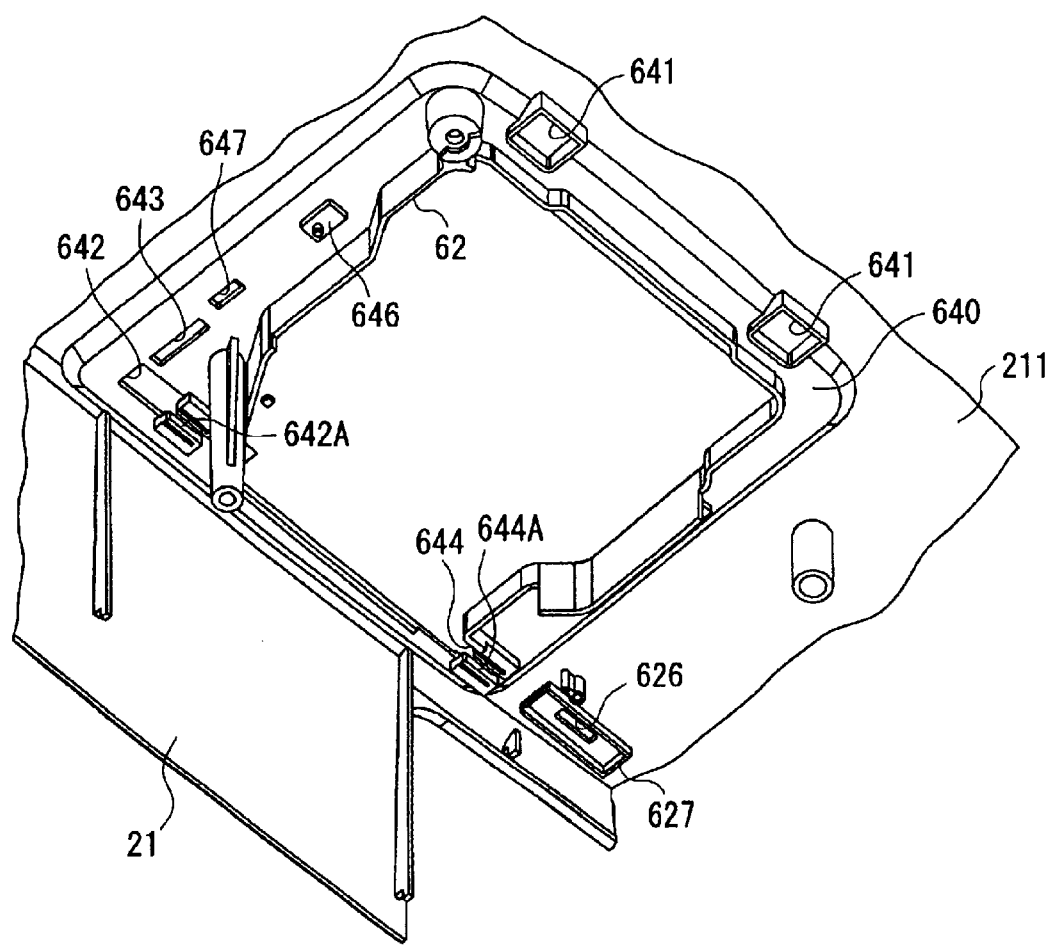
FIG. 18 is a perspective view seen from inside showing the upper case with the lamp cover being detached in the aforesaid second embodiment (no lock lever and plate spring)

As shown in FIG. 17, inside the upper case 21, a stick-shaped lock lever 650 and a pair of metal plate springs 66 are attached to the step portion 640. FIG. 18 shows a condition where the lock lever 650 and the plate spring 66 are detached from the condition shown in FIG. 17.

In FIG. 18, grooves 642A and 644A are formed on a part of the second engagement hole 642 and a part of the second engagement notch 644 of the step portion 640. The grooves 642A and the 644A longitudinally extend along the fore side periphery 61D of the lamp cover 61. The lock lever 650 is supported by the grooves 642A and 644A to be attached to the upper case 21.

A spring attachment 646 for a pair of plate springs 66 to be attached and a spring exposure hole 647 for exposing an end of the plate spring 66 from the inside of the upper case 21 toward the outside are formed on the step portion 640.

Further, a projected thread 627 surrounding the circumference of the switch hole 626 is formed inside the upper case 21.

Figure 19:
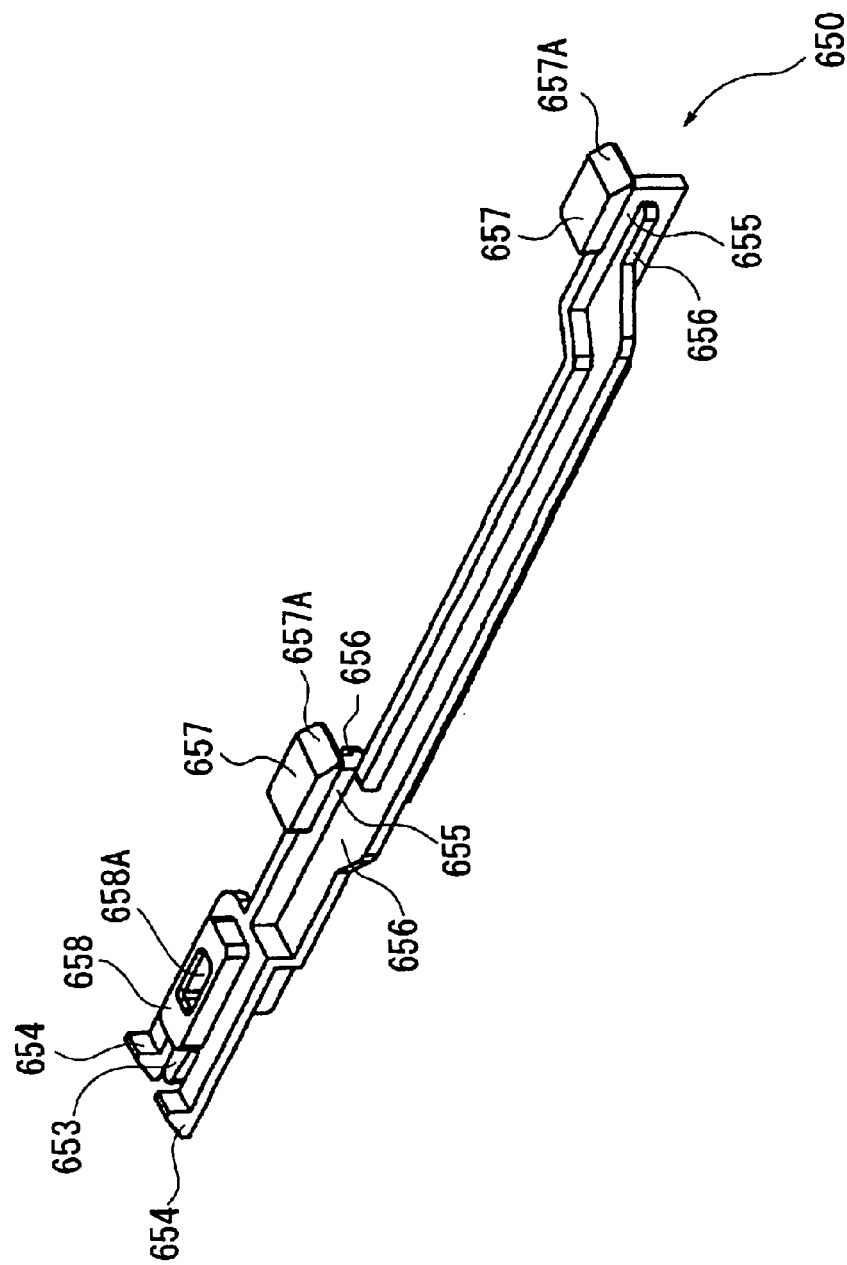
FIG. 19 is a perspective view seen from above showing the lock lever according to the aforesaid second embodiment.

As shown in FIG. 19, the lock lever 650 integrally has a claw 657 located along the longitudinal direction of the lock lever 650 corresponding to the respective positions of the grooves 642A and 644A of the upper case 21 and the operation switch 658 located at a position corresponding to the switch hole 626 of the upper case 21.

The claw 657 engages the claw 602A of the second engagement portion 602 of the lamp cover 61 when the lamp cover 61 is attached to the exterior case 2, and the number thereof corresponds to the number of the second engagement portion 602 of the lamp cover 61 (two in the present embodiment). The claw 657 has a slanted surface 657A facing upward.

A slide 655 located inside the grooves 642A and 644A of the upper case 21 and slidable relative to the grooves 642A and 644A is provided at a lower side of the claw 657.

A recess 658A opening upward is formed on the upper side of the operation switch 658. The operation switch 658 is located inside the projected thread 627 of the upper case 21 and is movable along the longitudinal direction in the projected thread 627. The recess 658A of the operation switch 658 is exposed to the outside by the switch hole 626 of the upper case 21. In other words, the operation switch 658 is located at a position recessed from the outer surface of the upper surface 211 of the upper case 21 toward inside.

When the lock lever 650 is attached to the upper case 21, two claws 657 of the lock lever 650 are respectively inserted to the second engagement hole 642 and the second engagement notch 644A of the upper case 21 from inside of the upper case 21. Subsequently, the lock lever 650 is moved toward the grooves 642A and 644A and the slide 655 is located inside the grooves 642A and 644A of the upper case 21. Accordingly, the claw 657 of the lock lever 650 is located inside the grooves 642A and 644A to be supported by the upper case 21, so that the lock lever 650 is attached to the upper case 21 as shown in FIG. 17.

Incidentally, receiving sections 656 are provided on both sides of the slide 655 of the lock lever 650 and the upper case 21 is sandwiched by the receiving section 656 and the claw 657 when the lock lever 650 is attached to the upper case 21. Accordingly, when the projector 1 is turned upside down, the lock lever 650 is not detached from the upper case 21.

An end of the lock lever 650 is fixed to the upper case 21 and the other end is biased in longitudinal direction from right to left in FIG. 17 (from left to right in FIG. 15) by a compression spring 67 attached to a spring receiving section 653 formed on the end (the end provided with the operation switch 658) of the lock lever 650.

The slanted surface 657A of the claw 657 of the lock lever 650 is slanted downward in the biased direction of the lock lever 650.

Incidentally, in order to prevent the slide 655 of the lock lever 650 from being fallen off from the grooves 642A and 644A by the biasing force of the compression spring 67, a stopper 654 (see FIG. 19) for restricting slide range of the lock lever 650 is formed on the lock lever 650. Accordingly, when the lock lever 650 is slid for a predetermined amount, the stopper 654 touches the projected thread 627 of the upper case 21 to restrict the slide range of the lock lever 650.

Back to FIG. 17, the pair of plate springs 66 attached on the inner surface of the upper case 21 are attached to the spring attachment 646 approximately at an center thereof.

A side 66A of the plate spring 66 extends in approximately horizontal direction, the tip end thereof being curved in approximate U-shape, the curved portion being exposed to the outside from the spring exposing hole 647. A projection 605 of the lamp cover 61 is capable of being inserted into the spring exposing hole 647 from above and of being in contact with a side of the curved portion of the side 66A of the plate spring 66.

The other end 66B of the plate spring 66 extends approximately obliquely downward and a tip end thereof being curved in approximate U-shape. The curved portion is in contact with the shield plate 80 covering the inner surface of the exterior case 2 as shown in FIG. 20.

Figure 20:
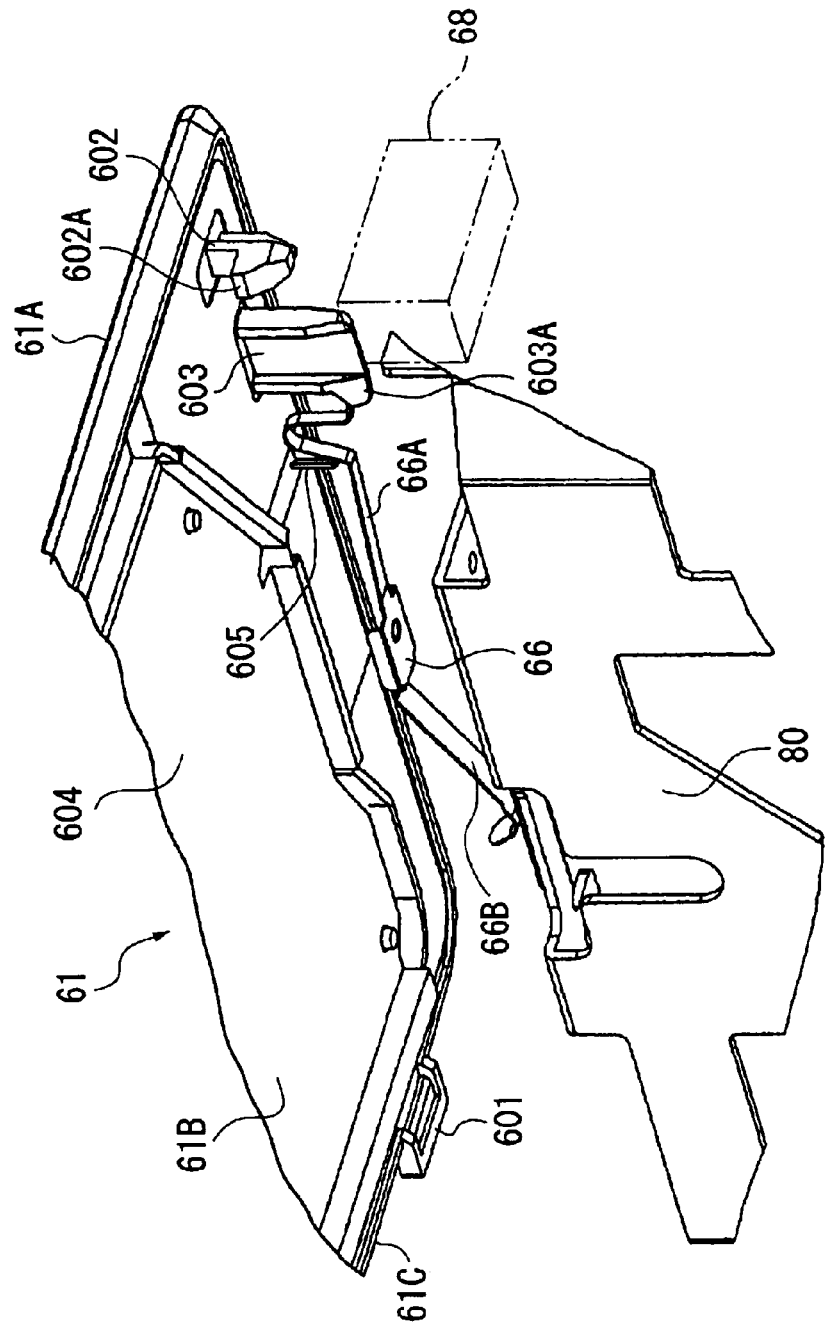
FIG. 20 is an enlarged perspective view illustrating positional relationship of the lamp cover, shield plate of exterior case and the plate spring in the aforesaid second embodiment.

FIG. 20 shows the lamp cover 61, the shield plate 80 of the exterior case 2, and the plate spring 66 disposed between the lamp cover 61 and the shield plate 80 of the exterior case 2 when the lamp cover 61 is attached to the exterior case 2. Incidentally, the FIG. 20 is an illustration where the exterior case 2 is not shown.

As shown in FIG. 20, when the lamp cover 61 is attached to the exterior case 2, the tip end 66A of the plate spring 66 is in contact with the shield plate 604 of the lamp cover 61 and the tip end of the other end 66B is in contact with the shield plate 80 of the exterior case 2, so that the shield plate 604 of the lamp cover 61 and the shield plate 80 of the exterior case 2 are electrically connected through the plate spring 66.

A cover sensor 68 (FIG. 3, FIG. 20) as a detector for detecting attachment/detachment of the lamp cover 61 to the exterior case 2 is provided to the projector 1.

The cover sensor 68 is a switch for connecting and isolating the electric circuit for electrically connecting the lamp driving circuit 32 of the power source unit 3 and the light source 413. The cover sensor 68 is attached inside the exterior case 2 at a location to be immediately below the engagement portion 603 when the lamp cover 61 is attached to the exterior case 2.

In the cover sensor 68, when the lamp cover 61 is attached to the exterior case 2, elastically deformable metal lever 681 (FIG. 3) of the cover sensor 68 is pushed down by an end of the engagement portion 603 to connect the electric circuit between the lamp driving circuit 32 and the light source 413. Accordingly, the light source lamp 411 of the light source 413 can be lit.

On the other hand, when the lamp cover 61 is detached from the exterior case 2 or when the lamp cover 61 is not securely attached to the exterior case 2, the metal lever 681 of the cover sensor 68 is not pushed down or not sufficiently pushed down by the engagement portion 603 of the lamp cover 61, so that the electric circuit between the lamp driving circuit 32 and the light source 413 is isolated. Accordingly, the light source lamp 411 of the light source 413 cannot be lit.

By providing the cover sensor 68, since the light source lamp 411 cannot be lit when the lamp cover 61 is not attached to the exterior case 2 or insufficiently attached, attachment failure etc. of the lamp cover 61 can be prevented.

Next, attachment and detachment process of the lamp cover 61 to the exterior case 2 according to the present embodiment will be described below.

5.1. Attachment Process of Lamp Cover

Initially, the first engagement portion 601 of the lamp cover 61 is inserted from above into the first engagement hole 641 of the upper case 21 obliquely from fore side to the rear side.

Subsequently, with the first engagement portion 601 of the lamp cover 61 as a fulcrum, the fore side periphery 61D of the lamp cover 61 is lowered and the claw 602A of the second engagement portion 602 is brought into contact with the slanted surface 657A of the claw 657 of the lock lever 650.

Then, when the fore side periphery 61D of the lamp cover 61 is further lowered, the second engagement portion 602 presses the slanted surface 657A of the claw 657 of the lock lever 650, so that the lock lever 650 slides from right to left in FIG. 15 along longitudinal direction thereof being allowed by the compression spring 67 on account of the inclination of the slanted surface 657A. Accordingly, the fore side periphery 61D of the lamp cover 61 can be further lowered.

When the fore side periphery 61D is further lowered so that the claw 602A of the second engagement portion 602 of the lamp cover 61 is situated lower than the position of the claw 657 of the lock lever 650, since nothing presses the slanted surface 657A of the claw 657 of the lock lever 650, the lock lever 650 returns to original position being biased by the compression spring 67. Accordingly, the claw 602A of the second engagement portion 602 of the lamp cover 61 and the claw 657 of the lock lever 650 are engaged to attach the lamp cover 61 to the upper case 21.

Figure 21:
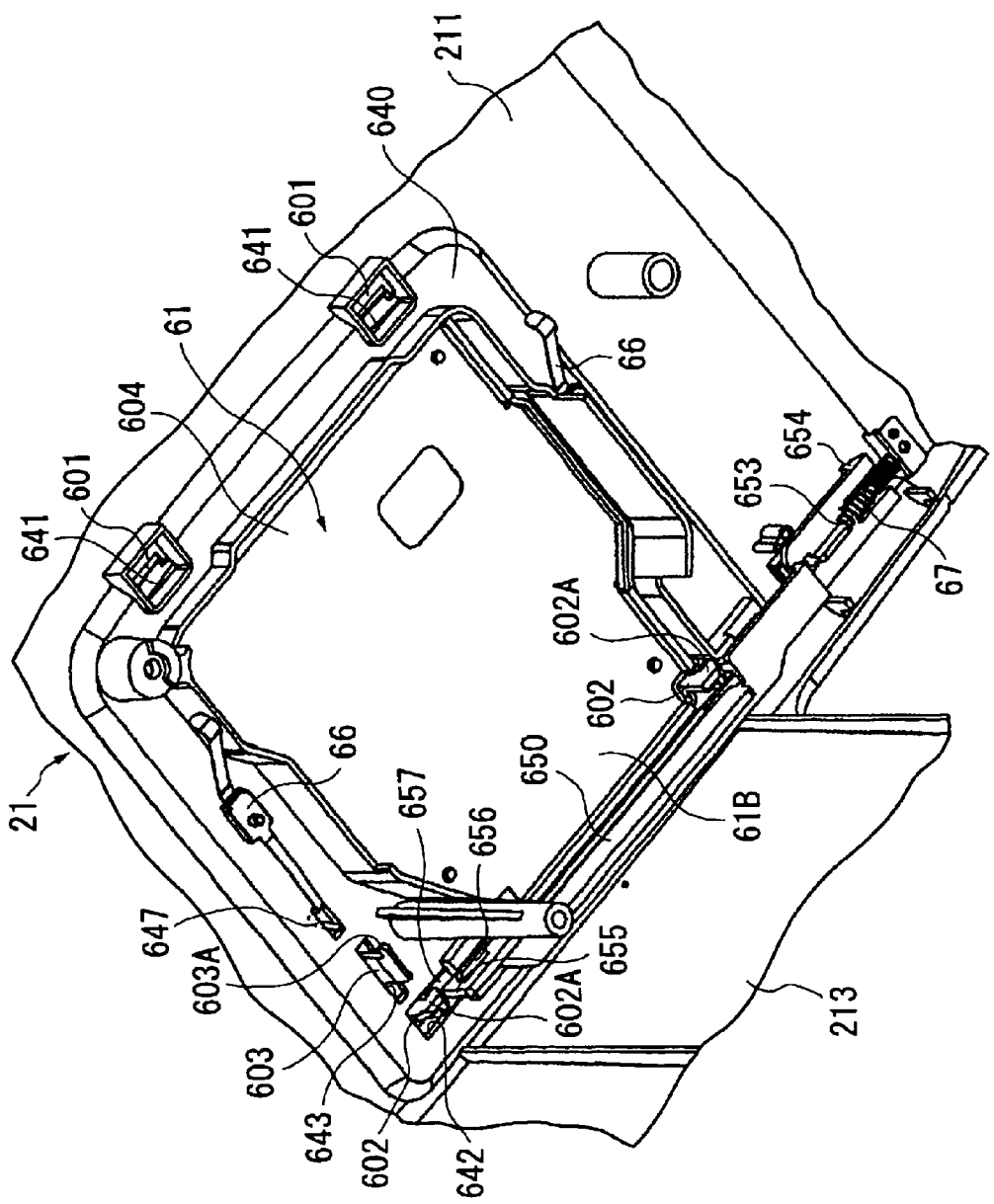
FIG. 21 is a perspective view seen from inside showing the upper case with the lamp cover being attached in the aforesaid second embodiment.

When the lamp cover 61 is attached to the upper case 21, the first engagement portion 601 of the lamp cover 61 is accommodated within the first engagement hole 641 of the upper case 21 and upper side thereof is covered with a part of the upper case 21 covering upper part of the first engagement hole 641, so that the first engagement portion 601 is engaged with the upper case 21 as shown in FIG. 21.

Accordingly, the lamp cover 61 is attached to the exterior case 2 by engaging the total four engagements of the two first engagements 601 and the two second engagement portions 602 with the upper case 21.

When the lamp cover 61 is attached to the exterior case 2, the shield plate 604 of the lamp cover 61 is electrically connected with the shield plate 80 of the exterior case 2 by the plate spring 66 as described above. The side 66A of the plate spring 66 is elastically deformed downward being pressed by the inner surface 61B of the lamp cover 61. Incidentally, the projection 605 of the lamp cover 61 is inserted within the spring exposing hole 647 of the upper case 21.

5.2. Detachment Process of Lamp Cover

Initially an end of pin member P (see double-dotted line in FIG. 15) is inserted into the switch hole 626 formed on the upper case 21 to be inserted to the recess 658A of the operation switch 658 of the lock lever 650. Keeping the condition, the pin member P is moved from right to left in FIG. 15. Accordingly, the lock lever 650 is slid from right to left in FIG. 15 being allowed by the compression spring 67, so that the engagement between the claw 657 of the lock lever 650 and the claw 602A of the second engagement portion 602 of the lamp cover 61 is released.

Figure 22:
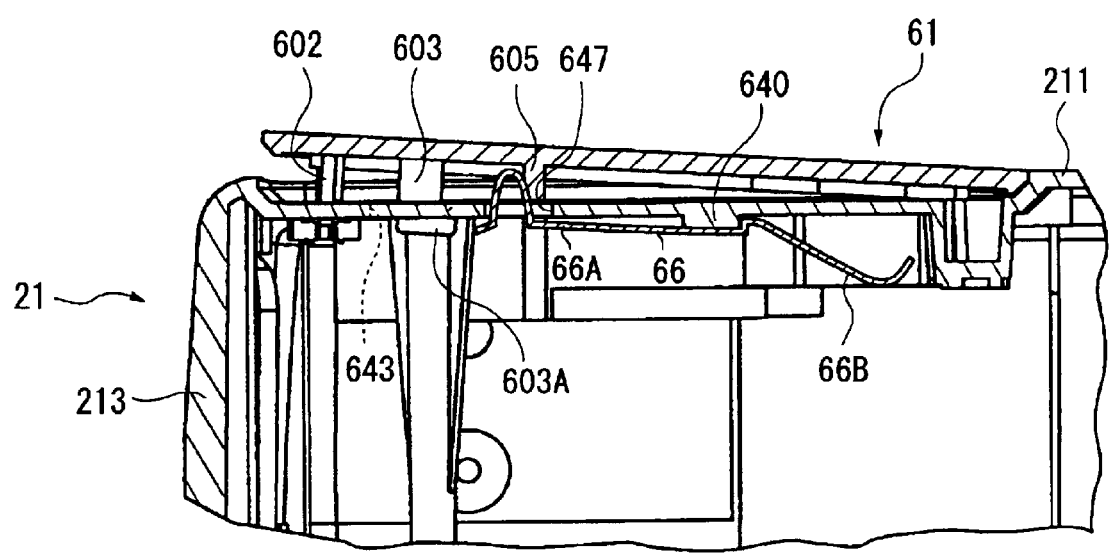
FIG. 22 is a cross section showing a condition where the lamp cover is slightly opened in the aforesaid second embodiment.

Then, the side 66A of the plate spring 66 is biased to return for compensation of the elastic deformation, so that the lamp cover 61 is biased upward by the plate spring 66. Accordingly, as shown in FIG. 22, the fore side periphery 61D of the lamp cover 61 is slightly moved upward with the first engagement portion 601 as a fulcrum to slightly open the lamp cover 61. In short, the side 66A of the plate spring 66 works a biasing that biases the lamp cover 61 in a direction opposite to inserting direction toward the upper case 21 of the second engagement portion 602 of the lamp cover 61. In other words, the side 66A of the plate spring 66 is the first biasing mechanism of the second embodiment of the present invention.

When the lamp cover 61 is thus slightly opened, the engagement portion 603 is engaged to the periphery of the engagement hole 643 of the upper case 21 and the first engagement portion 601 is engaged with the first engagement hole 641 of the upper case 21.

The lamp cover 61 is biased toward the inserting direction of the first engagement portion 601 toward the upper case 21 by the plate spring 66. Specifically, the projection 605 of the lamp cover 61 is biased from left to right in FIG. 22, in other words, the first engagement portion 601 of the lamp cover 61 is biased in the inserting direction into the first engagement hole 641 of the upper case 21 by the side of the curved portion of the side 66A of the plate spring 66. Accordingly, the engagement between the first engagement portion 601 of the lamp cover 61 and the first engagement hole 641 of the upper case 21 can be maintained. In short, the side 66A of the plate spring 66 works a biasing that biases the lamp cover 61 in an inserting direction toward the upper case 21 of the first engagement portion 601 of the lamp cover 61. In other words, the side 66A of the plate spring 66 is the second biasing mechanism of the second embodiment of the present invention.

Accordingly, even when the projector 1 is attached on a ceiling and the upper surface 211 is faced downward, the lamp cover 61 can be kept being slightly opened.

Subsequently, the engagement portion 603 of the lamp cover 61 can be detached from the engagement hole 643 of the upper case 21 by sliding the lamp cover 61 from the hind side to the fore side, so that the lamp cover 61 can be detached from the exterior case 2.

Advantage of Second Embodiment

According to the above-described present embodiment, following advantages can be obtained.

Since the lamp cover 61 is disposed on the upper surface 211 of the upper case 21 in the present embodiment, the light source 413 can be exchanged while the upper surface 211 of the projector 1 is faced upward and it is not necessary to turn the projector 1 upside down unlike the conventional arrangement. Accordingly, re-adjustment of the attitude and position of the projector 1 is not necessary after exchanging the light source 413, so that exchanging work of the light source 413 can be facilitated.

Even when the projector 1 is attached on a ceiling, the lamp cover 61 can be detached from the upper surface 211 that faces downward, it is not necessary to detach the projector 1 from the ceiling, so that exchange work of the light source 413 can be facilitated.

Since the lamp cover 61 is disposed only on the upper surface 211 of the upper case 21 in the present embodiment, the lamp cover 61 does not interfere with the exhaust hole 212B etc. formed on the front surface 213 of the upper case 21, thereby enhancing freedom of design.

Since the lamp cover 61 is located only on the upper surface 211 of the upper case 21 and is not extended on the front surface 213, appearance can be improved.

Since the lamp cover 61 is attached by engaging with the upper case 21 and the operation switch 658 for releasing engagement of the lamp cover 61 to the upper case 21 by sliding the operation switch 658 with the pin member P is provided, the lamp cover 61 can be detached from the exterior case 2 with one touch, thereby further facilitating exchange work of the light source 413.

In the engagement structure of the lamp cover 61 and the exterior case 2, since the first engagement portion 601, the second engagement portion 602, the lock lever 650 etc. constructing the engagement structure are disposed inner side of the exterior case 2 and the lamp cover 61 and the operation switch 658 (switch hole 626) are disposed at a position remote from the lamp cover 61, it is not necessary to form notch etc. for forming the engagement structure and the operation switch 658 on the outer surface of the lamp cover 61 exposed to the outside. Accordingly, the gap between the outer surface 61A of the lamp cover 61 exposed outside and the outer surface of the upper surface 211 of the upper case 21 can be made minimum, so that light leakage of the light source 413 from the gap can be prevented and appearance can be improved.

Since the operation switch 658 of the lock lever 650 is disposed inside the exterior case 2 and is exposed toward the outside through the switch hole 626, erroneous touch on the operation switch 658 to slide the lock lever 650 in carrying and operating the projector 1 can be prevented, thereby preventing unexpected fall-off of the lamp cover 61 by erroneous operation.

In the lamp cover 61, the first engagement portion 601 and the second engagement portion 602 inserted to the upper case 21 mutually in different direction are provided, the lamp cover 61 is unlikely to be detached from the exterior case 2 and the lamp cover 61 can be securely attached to the exterior case 2.

Further, since the four corners of the lamp cover 61 are attached to the exterior case 2 by the total four engagements of the two first engagement portions 601 and the two second engagement portions 602, the lamp cover 61 can be further securely attached to the exterior case 2.

Since the plate spring 66 for biasing the lamp cover 61 in a direction for drawing out the second engagement portion 602 of the lamp cover 61 from the upper case 21, i.e. in upward direction, is provided, the second engagement portion 602 can be pushed upward by releasing the engagement of the second engagement portion 602 by sliding the operation switch 658, so that the lamp cover 61 can be easily detached from the upper case 21, thereby facilitating detachment of the lamp cover 61.

Since the shield plate 80 of the exterior case 2 and the shield plate 604 of the lamp cover 61 are provided and the shield plates 80 and 604 are electrically connected by the plate spring 66, leakage of electromagnetic noise from the inside of the exterior case 2 toward outside can be prevented.

Since the engagement portion 603 is provided on the lamp cover 61, slightly open condition of the lamp cover 61 can be maintained, so that the lamp cover 61 is not detached from the exterior case 2 simultaneously with operating the operation switch 658.

Accordingly, when the projector 1 is installed on a ceiling, the lamp cover 61 is not detached simultaneously with operating the operation switch 658, the fall-off can be prevented without holding the lamp cover 61 by hand, thereby enhancing workability.

Since the cover sensor 68 for detecting attachment/detachment of the lamp cover 61 to the upper case 21 is provided and the operation of the cover sensor 68 is conducted by the engagement portion 603 of the lamp cover 61, no independent component for operating the cover sensor 68 is necessary for lamp cover 61, thereby reducing the number of components.

Since the cover sensor 68 is provided, attachment failure etc. of the lamp cover 61 to the exterior case 2 can be prevented.

Since the lamp cover 61 is biased in the inserting direction of the first engagement portion 601 to the upper case 21 by the plate spring 66, the first engagement portion 601 is not fallen off from the exterior case 2 even when the engagement of the second engagement portion 602 is released by the operation switch 658. Accordingly, the lamp cover 61 is not detached simultaneously with releasing the engagement of the lamp cover 61 by the operation switch 658, so that the lamp cover 61 is not fallen to be damaged when the projector 1 is attached to a ceiling.

Further, in the present embodiment, the plate spring 66 biases the lamp cover 61 in upward direction (working as the first biasing mechanism in the first embodiment of the present invention), electrically connects the shield plates 80 and 604, and works as the second biasing mechanism of the present invention, so that the number of components can be reduced.

(Modifications of Second Embodiment)

In the above-described second embodiment, following modification is also included in the scope of the present invention.

The detector may be a sensor in which a laser beam is shut by the engagement at the halfway thereof when the lamp cover is attached to the exterior case. The detector may be operated not only by the engagement but by a dedicated component provided to the lamp cover for operating the detector.

The number of the engagement is not restricted to one but may be provided in plural and the first and the second engagement portions may be provided more than two.

The number of the first engagement portion may be one. In such arrangement, the first engagement portion may preferably be longitudinally extended along the direction of the hind side periphery 61C of the lamp cover. Accordingly, the hind side periphery 61C of the lamp cover can be stably engaged to the exterior case.

The first biasing mechanism is not restricted to be composed of a part of shield plate inside the exterior case or an elastic member of a detector, but may be constructed independently using other elastic member etc. The first biasing mechanism may not work both for biasing the lamp cover in a predetermined direction and for electrically connecting the shields, but may solely work for biasing the lamp cover in a predetermine direction. In such arrangement, resin spring material or a rubber material may be used.

The first and the second engagement portions may not be inserted to the exterior case in mutually different direction, but may be inserted to the exterior case along a direction approximately orthogonal with the top surface.

The operation switch may not be located at a position recessed inside the exterior case, but may be projected from outer surface of the exterior case.

The operating portion is not restricted to the operation switch but may be arranged in other way as long as the engagement of the lamp cover and the exterior case can be released.

The attachment of the lamp cover is not restricted to the engagement structure located inside the exterior case but may be exposed to the outside or may be fitted by screw.

The shield provided on the inner surface of the lamp cover and inside the exterior case is not restricted to have a plate-shape, but may be formed on the inner surface of the lamp cover and the exterior case by vacuum evaporation.

The projector of the present invention may not use the liquid crystal panel as an optical modulator, but may have an optical modulator other than the liquid crystal such as a device using plasma element and a micro mirror, a reflection-type optical modulator having the same light-incident surface and the light-emitting surface, a single-plate type, a double-plate type or a rear-type. In other words, the arrangement can be designed at will in implementing the present invention as long as a projector modulates a light beam irradiated by a light source lamp in accordance with image information to form an optical image for enlarging and projecting the optical image.

What is claimed is:

1. A projector having a light source and an exterior case that accommodates the light source, the projector modulating, enlarging and projecting a light beam irradiated by the light source to form a projection image, the projector further comprising:
    an opening formed on the exterior case at a position corresponding to the light source;
    a slidable lamp cover that closes the opening, the lamp cover being capable of being attached to and detached from the exterior case;
    a first biasing mechanism that biases the lamp cover along slide direction thereof toward outside of the exterior case;
    an engagement structure that fixes the lamp cover to the exterior case; and
    an operating portion that is operated to release engagement of the engagement structure by being operated.

2. The projector according to claim 1, wherein the lamp cover is disposed on a top surface of the exterior case.

3. The projector according to claim 1, wherein the first biasing mechanism is formed by a part of an elastically deformable shield plate provided in the exterior case.

4. The projector according to claim 1,
    wherein a detector that detects attachment/detachment of the lamp cover to the exterior case is provided on the exterior case, the detector having a detection switch biased toward the lamp cover that is actuated being pressed by the lamp cover in a direction approximately opposite to biased direction thereof, the detector determining attachment/detachment of the lamp cover to the exterior case based on whether the detection switch is pressed by the lamp cover for a predetermined amount or not, and
    wherein the first biasing mechanism also works as the detection switch of the detector.

5. The projector according to claim 1,
    wherein a shield covering an inner surface of the lamp cover is provided on the lamp cover, the shield being electrically conducted with a shield provided in the exterior case.

6. The projector according to claim 1, wherein the engagement structure is located inside the exterior case.

7. The projector according to claim 1, wherein the operating portion is disposed at a position recessed toward inside of the exterior case.

8. The projector according to claim 1, wherein a slide portion capable of sliding in the slide portion direction relative to the exterior case is formed on the lamp cover,
    wherein a guide in slide contact with the slide of the lamp cover is formed at a periphery of the opening of the exterior case along the slide direction,
    wherein a notch is formed in the intermediary of the guide of the exterior case, and
    wherein the slide portion of the lamp cover is capable of being fitted into and detached from the exterior case.

9. The projector according to claim 8, further comprising a second biasing mechanism that biases the lamp cover in a direction to be away from the exterior case along fitting/detaching direction of the slide portion.

10. The projector according to claim 9, wherein the second biasing mechanism is formed by a part of elastically deformable shield plate provided in the exterior case and/or a part of elastically deformable shield plate covering an inner surface of the lamp cover.

11. A projector having a light source and an exterior case that accommodates the light source, the projector modulating, enlarging and projecting a light beam irradiated by the light source to form a projection image, the projector further comprising:
    an opening formed only on a top surface of the exterior case at a position corresponding to the light source;
    a lamp cover that closes the opening, the lamp cover disposed only on the top surface of the exterior case and capable of being attached to and detached from the exterior case;
    an engagement structure that engages the lamp cover with the exterior case to attach the lamp cover to the exterior case; and
    an operating portion that is operated to release the engagement structure.

12. The projector according to claim 11,
    wherein the engagement structure is disposed inside the exterior case, and
    wherein the operating portion is disposed away from the lamp cover.

13. The projector according to claim 11, wherein the operating portion is disposed at a position recessed toward inside of the exterior case.

14. The projector according to claim 11,
wherein the engagement structure that engages the lamp cover with the exterior case is provided on the lamp cover, the engagement structure including a first engagement portion and a second engagement portion inserted and engaged with the exterior case, and wherein the first engagement portion is inserted to the exterior case along a direction approximately parallel to the top surface and the second engagement portion is inserted to the exterior case along a direction approximately orthogonal with the top surface.

15. The projector according to claim 14, further comprising a first biasing mechanism that biases the lamp cover in a direction opposite to inserting direction toward the exterior case of the second engagement portion of the lamp cover.

16. The projector according to claim 15, further comprising shields respectively covering inner surface of the exterior case and inner surface of the lamp cover, wherein the first biasing mechanism is made of metal, and wherein an end of the first biasing mechanism is in contact with the shield covering the inner surface of the exterior case and the other end is in contact with the shield covering the inner surface of the lamp cover when the lamp cover is attached to the exterior case.

17. The projector according to claim 14, further comprising a second biasing mechanism that biases the lamp cover in an inserting direction toward the exterior case of the first engagement portion of the lamp cover.

18. The projector according to claim 11, the lamp cover comprising an engagement portion for engaging the lamp cover with the exterior case while the lamp cover is slightly opened.

19. A projector having a light source and an exterior case that accommodates the light source, the projector modulating, enlarging and projecting a light beam irradiated by the light source to form a projection image, the projector further comprising:

an opening formed only on a top surface of the exterior case at a position corresponding to the light source; and a lamp cover that closes the opening, the lamp cover disposed only on the top surface of the exterior case and capable of being attached to and detached from the exterior case, the lamp cover comprising an engagement portion for engaging the lamp cover with the exterior case while the lamp cover is slightly opened.

20. The projector according to claim 19, wherein a detector that detects attachment/detachment of the lamp cover to the exterior case is provided to the exterior case, and wherein the detector is operated by the engagement portion of the lamp cover.

* * * * *

UNITED STATES PATENT AND TRADEMARK OFFICE
CERTIFICATE OF CORRECTION

PATENT NO.   : 6,755,541 B2
DATED        : June 29, 2004
INVENTOR(S)  : Hiroshisa Nakano et al.

It is certified that error appears in the above-identified patent and that said Letters Patent is hereby corrected as shown below:

Title page,
Item [75], to read as follows:
-- [75] Inventors: Hirohisa Nakano, Matsumoto (JP); Teruo Sakuai, Matsumoto (JP); Kiyotaka Nakano, Matsumoto (JP); Tsuyoshi Arai, Shiojiri (JP) --

Signed and Sealed this

Twelfth Day of April, 2005

JON W. DUDAS
*Director of the United States Patent and Trademark Office*